US008767247B2

(12) United States Patent
Ozawa et al.

(10) Patent No.: US 8,767,247 B2
(45) Date of Patent: Jul. 1, 2014

(54) PRINT DATA GENERATION DEVICE, PRINT DATA GENERATION METHOD AND COMPUTER-READABLE MEDIUM FOR CONTROLLING RASTERIZATION PROCESSING

(75) Inventors: Masahiro Ozawa, Tokyo (JP); Fumihito Akiyama, Tokyo (JP); Jun Kuroki, Superior, CO (US); Takahisa Matsunaga, Tokyo (JP); Hiroshi Nogawa, Tokyo (JP); Yasufumi Aoyama, Tokyo (JP); Kunikazu Satou, Tokyo (JP); Yasutaka Shimohara, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/309,210

(22) Filed: Dec. 1, 2011

(65) Prior Publication Data

US 2012/0140259 A1 Jun. 7, 2012

(30) Foreign Application Priority Data

Dec. 1, 2010 (JP) ................................. 2010-268121

(51) Int. Cl.
*G06K 15/00* (2006.01)
(52) U.S. Cl.
USPC .......................... 358/1.16; 358/1.13; 358/1.17
(58) Field of Classification Search
CPC ...... G06F 3/1215; G06F 3/124; G06F 3/1247; G06K 15/1861; G06K 15/1863
USPC ....................... 358/1.13, 1.16, 1.17
See application file for complete search history.

(56) References Cited

U.S. PATENT DOCUMENTS

| 5,781,707 | A * | 7/1998 | Kunz et al. ...................... 358/1.5 |
| 7,202,964 | B2 * | 4/2007 | Christiansen ................ 358/1.15 |
| 8,253,962 | B2 * | 8/2012 | Sato et al. .................... 358/1.15 |
| 2005/0094175 | A1 * | 5/2005 | Christiansen et al. ....... 358/1.13 |
| 2008/0198414 | A1 * | 8/2008 | Ozawa et al. ................. 358/1.17 |
| 2009/0244593 | A1 * | 10/2009 | Prebble ......................... 358/1.15 |
| 2010/0079809 | A1 * | 4/2010 | Bellert ......................... 358/1.17 |
| 2011/0304871 | A1 * | 12/2011 | Matsunaga et al. .......... 358/1.13 |

FOREIGN PATENT DOCUMENTS

| JP | 2003-51019 | 2/2003 |
| JP | 2006-159738 | 6/2006 |
| JP | 2008-195021 | 8/2008 |

* cited by examiner

*Primary Examiner* — Benny Q Tieu
*Assistant Examiner* — Quyen V Ngo
(74) *Attorney, Agent, or Firm* — Osha Liang LLP

(57) ABSTRACT

Disclosed is a print data generation device comprising: a storage unit including: a region in which there are temporarily stored data in an intermediate language format between data in a page description language format and print data, and the print data to be generated based on the data in the intermediate language format; and a rasterization region for use at a time when rasterization processing in which the print data is to be generated based on the data in the intermediate language format is executed; and a control unit that includes a plurality of arithmetic operation parts, sets arithmetic operation parts which execute the rasterization processing based on a status of use of the arithmetic operation parts and a status of a free region of the storage unit, and executes the rasterization processing for each of the set arithmetic operation parts.

12 Claims, 27 Drawing Sheets

FIG.8A

| BAND NUMBER | BAND STATE |
|---|---|
| 1 | BITMAP IS NOT GENERATED |
| 2 | BITMAP IS NOT GENERATED |
| 3 | BITMAP IS NOT GENERATED |
| 4 | BITMAP IS NOT GENERATED |
| ⋮ | ⋮ |
| M | BITMAP IS NOT GENERATED |

FIG.8B

| CORE NUMBER | RAS SLAVE NUMBER | RASTERIZATION PROCESSING TIME (ms) | DELETION INSTRUCTION FLAG |
|---|---|---|---|
| 1 | 1 | — | — |
| 2 | — | — | — |
| 3 | — | — | — |
| 4 | — | — | — |
| ⋮ | ⋮ | ⋮ | ⋮ |
| L | — | — | — |

FIG.10A

| BAND NUMBER | BAND STATE |
|---|---|
| 1 | ASSIGNED TO RAS SLAVE 1 |
| 2 | ASSIGNED TO RAS SLAVE 2 |
| 3 | ASSIGNED TO RAS SLAVE 3 |
| 4 | BITMAP IS NOT GENERATED |
| ⋮ | ⋮ |
| M | BITMAP IS NOT GENERATED |

FIG.10B

| CORE NUMBER | RAS SLAVE NUMBER | RASTERIZATION PROCESSING TIME(ms) | DELETION INSTRUCTION FLAG |
|---|---|---|---|
| 1 | 1 | — | — |
| 2 | 2 | — | — |
| 3 | — | — | — |
| 4 | 3 | — | — |
| ⋮ | ⋮ | ⋮ | ⋮ |
| L | — | — | — |

FIG.12

| CORE NUMBER | RAS SLAVE NUMBER | RASTERIZATION PROCESSING TIME(ms) | DELETION INSTRUCTION FLAG |
|---|---|---|---|
| 1 | 1 | 10 | — |
| 2 | 2 | 180 | — |
| 3 | — | — | — |
| 4 | 3 | 60 | — |
| ⋮ | ⋮ | ⋮ | ⋮ |
| L | — | — | — |

*FIG.13*

| CORE NUMBER | RAS SLAVE NUMBER | RASTERIZATION PROCESSING TIME(ms) | DELETION INSTRUCTION FLAG |
|---|---|---|---|
| 1 | 1 | 10 | — |
| 2 | 2 | 180 | — |
| 3 | — | — | — |
| 4 | 3 | 60 | YES |
| ⋮ | ⋮ | ⋮ | ⋮ |
| L | — | — | — |

FIG.14A

| BAND NUMBER | BAND STATE |
|---|---|
| 1 | ASSIGNED TO RAS SLAVE 1 |
| 2 | ASSIGNED TO RAS SLAVE 2 |
| 3 | BITMAP IS NOT GENERATED |
| 4 | BITMAP IS NOT GENERATED |
| ⋮ | ⋮ |
| M | BITMAP IS NOT GENERATED |

FIG.14B

| CORE NUMBER | RAS SLAVE NUMBER | RASTERIZATION PROCESSING TIME(ms) | DELETION INSTRUCTION FLAG |
|---|---|---|---|
| 1 | 1 | 10 | — |
| 2 | 2 | 180 | — |
| 3 | — | — | — |
| 4 | — | — | — |
| ⋮ | ⋮ | ⋮ | ⋮ |
| L | — | — | — |

FIG.15A

| BAND NUMBER | BAND STATE |
|---|---|
| 1 | BITMAP IS ALREADY GENERATED |
| 2 | ASSIGNED TO RAS SLAVE 2 |
| 3 | BITMAP IS NOT GENERATED |
| 4 | BITMAP IS NOT GENERATED |
| ⋮ | ⋮ |
| M | BITMAP IS NOT GENERATED |

FIG.15B

| CORE NUMBER | RAS SLAVE NUMBER | RASTERIZATION PROCESSING TIME(ms) | DELETION INSTRUCTION FLAG |
|---|---|---|---|
| 1 | 1 | — | — |
| 2 | 2 | 180 | — |
| 3 | — | — | — |
| 4 | — | — | — |
| ⋮ | ⋮ | ⋮ | ⋮ |
| L | — | — | — |

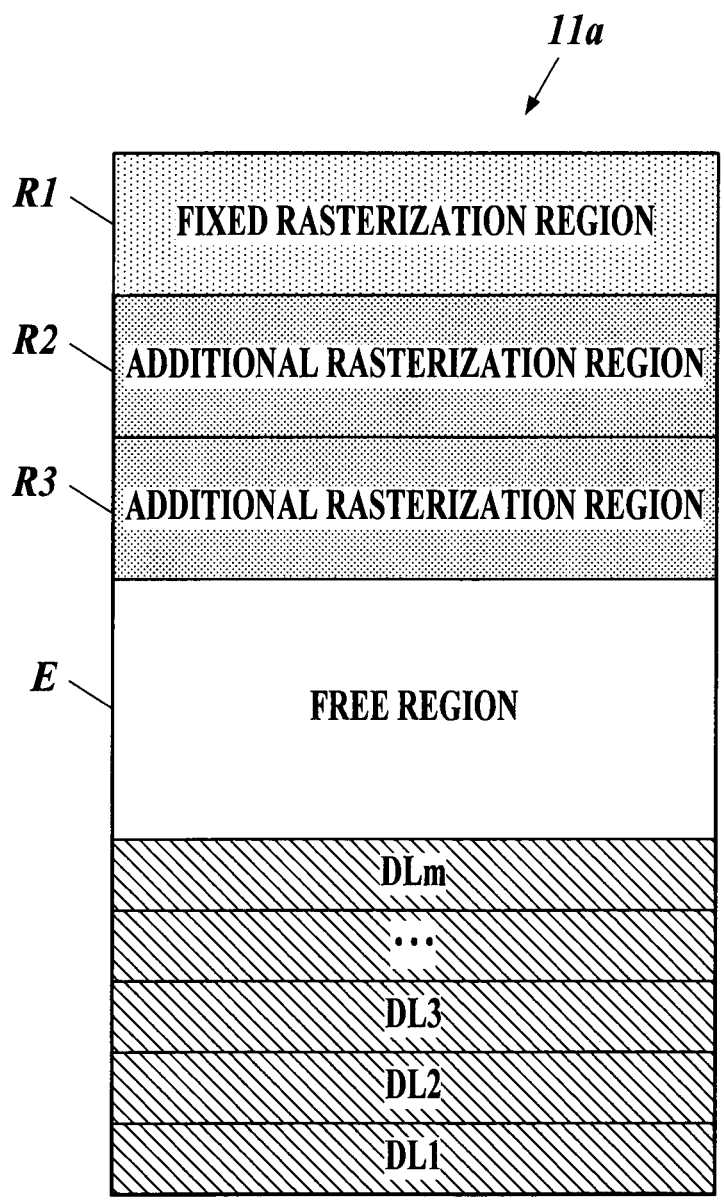

PRINT DATA GENERATION DEVICE, PRINT DATA GENERATION METHOD AND COMPUTER-READABLE MEDIUM FOR CONTROLLING RASTERIZATION PROCESSING

CROSS-REFERENCE TO RELATED APPLICATION

The present U.S. patent application claims a priority under the Paris Convention of Japanese patent application No. 2010-268121 filed on Dec. 1, 2010, which shall be a basis of correction of an incorrect translation.

BACKGROUND OF THE INVENTION

1. Field of the Invention

The present invention relates to a print data generation device, a print data generation method and a computer-readable medium.

2. Description of the Related Art

In recent years, a multi-core processor has been developed, which is composed by integrating a plurality of arithmetic operation parts (hereinafter, referred to as cores) such as processor cores in one package, and enhances processing performance by dispersing processing to the respective cores and performing parallel processing.

In particular, in an image forming apparatus such as a multi-function peripheral (MFP) and a printer, the following has been proposed. Specifically, by using this multi-core processor, analysis processing for analyzing data in a Page Description Language (PDL) format and generating data in an intermediate language (DL: Display List) format, rasterization processing for generating data in a bitmap format from the data in the intermediate language format, processing for transferring, as print data, the data in the bitmap format to a print unit and forming an image, and the like are assigned to the respective cores, and the respective pieces of the processing are executed in parallel, whereby speed enhancement of a series of the processing related to print output is achieved.

For example, there are disclosed: a technology for, in the case of performing rasterization in parallel by using a plurality of processors, detecting a processor on standby for processing, and assigning rasterization processing for an unprocessed band region to the processor on standby for the processing (refer to Japanese Patent Laid-Open Publication No. 2003-51019 as Patent Literature 1); and a technology for distributing, for each page, PDL data or intermediate data or a display list to a plurality of central processing units (CPUs) (refer to Japanese Patent Laid-Open Publication No. 2006-159738 as Patent Literature 2).

However, in Patent Literature 1, such a band to be rasterized is assigned only by determining states of the processors, and accordingly, in the case where there occurs a lack of a memory region for use in the rasterization processing, the processing is stopped temporarily. Moreover, in Patent Literature 2, the CPUs perform the processing for each page, and accordingly, reduction of a total processing time for a plurality of pages can be achieved; however, reduction of a processing time per page cannot be achieved. In addition, at the time of distributing the data, a state of the memory region into which the data is to be expanded is not considered, and it is apprehended that the processing for the distributed data may be stopped. As described above, even in the case where the plurality of arithmetic operation parts are provided, such a problem occurs that the respective arithmetic operation parts are not used effectively in response to the states of the arithmetic operation parts and the state of the memory region.

SUMMARY OF THE INVENTION

It is an object of the present invention to achieve the effective use of the plurality of arithmetic operation parts and the memory region, and to enhance generation efficiency of the print data.

To achieve at least one of the abovementioned objects, a print data generation device, reflecting one aspect of the present invention comprises:

a storage unit including: a region in which there are temporarily stored data in an intermediate language format between data in a page description language format and print data, and the print data to be generated based on the data in the intermediate language format; and a rasterization region for use at a time when rasterization processing in which the print data is to be generated based on the data in the intermediate language format is executed; and a control unit that includes a plurality of arithmetic operation parts, sets arithmetic operation parts which execute the rasterization processing based on a status of use of the arithmetic operation parts and a status of a free region of the storage unit, and executes the rasterization processing for each of the set arithmetic operation parts.

To achieve at least one of the abovementioned objects, a print data generation method, reflecting another aspect of the present invention comprises:

based on a status of use of a plurality of arithmetic operation parts which perform rasterization processing in which print data is to be generated based on data in an intermediate language format between data in a page description language format and the print data, and on a status of a free region of a storage unit that includes a rasterization region for use at a time when the rasterization processing is executed, setting arithmetic operation parts which execute the rasterization processing; and executing the rasterization processing for each of the set arithmetic operation parts.

To achieve at least one of the abovementioned objects, there is provided a computer-readable medium, reflecting still another aspect of the present invention, the medium embodying a program for allowing execution of the steps of:

based on a status of use of a plurality of arithmetic operation parts which perform rasterization processing in which print data is to be generated based on data in an intermediate language format between data in a page description language format and the print data, and on a status of a free region of a storage unit that includes a rasterization region for use at a time when the rasterization processing is executed, setting arithmetic operation parts which execute the rasterization processing; and executing the rasterization processing for each of the set arithmetic operation parts.

BRIEF DESCRIPTION OF THE DRAWINGS

The present invention will become more fully understood from the detailed description given hereinbelow and the appended drawings, and thus are not intended as a definition of the limits of the present invention, wherein;

FIG. 8A is a view showing an example of a band state monitoring table in Step S21;

FIG. 8B is a view showing an example of a RAS slave state monitoring table in Step S21;

FIG. 10A is view showing an example of the band state monitoring table when the update processing for the band state monitoring table is ended;

FIG. 10B is a view showing an example of the RAS slave state monitoring table when the update processing for the band state monitoring table is ended;

FIG. 12 is a view showing an example of the RAS slave state monitoring table when processing of Step S57 is ended in a slave in which a RAS slave number is 1;

FIG. 13 is a view showing an example of the RAS slave state monitoring table when processing of Step S62 is ended in the slave in which the RAS slave number is 1;

FIG. 14A is a view showing an example of the band state monitoring table when processing of Step S66 after Step S55: YES in a slave in which the RAS slave number is 4;

FIG. 14B is a view showing an example of the band state monitoring table when the processing of Step S66 after Step S55: YES in the slave in which the RAS slave number is 4;

FIG. 15A is a view showing an example of the band state monitoring table when processing of Step S64 is ended after the slave in which the RAS slave number is 4 is deleted in the slave in which the RAS slave number is 1;

FIG. 15B is a view showing an example of the RAS slave state monitoring table when processing Step S65 is ended in the slave in which the RAS slave number is 1;

FIG. 16A to FIG. 16D are conceptual views of an inside of a sharing storage region;

DETAILED DESCRIPTION OF THE PREFERRED EMBODIMENTS

A description is made below of an embodiment related to a print data generation device, print data generation method and medium of the present invention with reference to the drawings.

First, a description is made of the configurations.

Figure 1:
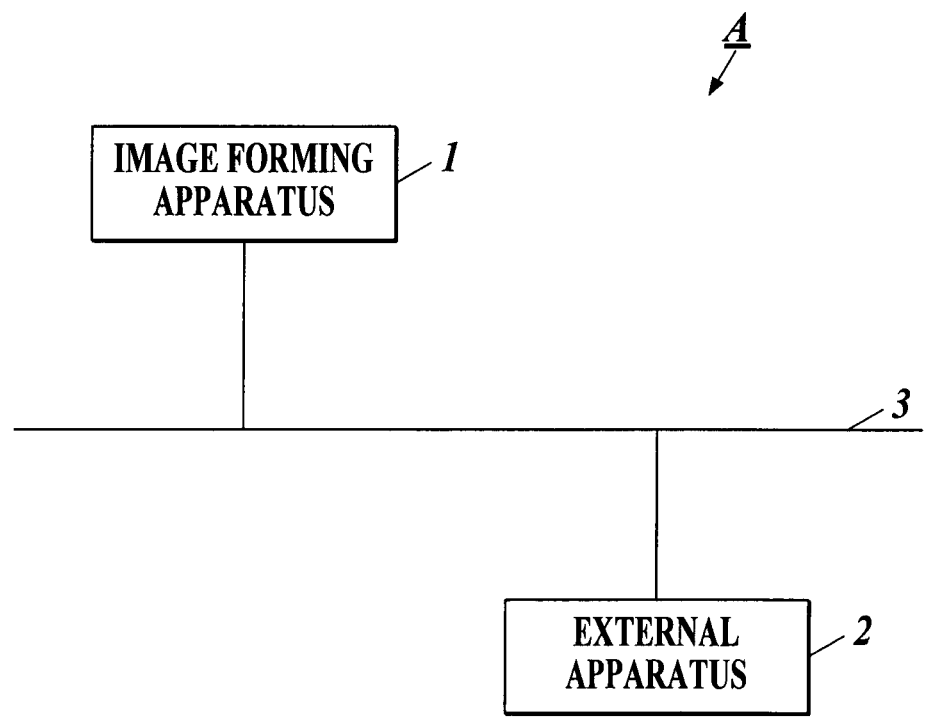
FIG. 1 is a view showing a system configuration example of an image forming system.

FIG. 1 shows a system configuration example of an image forming system A in this embodiment.

As shown in FIG. 1, the image forming system A is composed, for example, by including an image forming apparatus 1 and an external apparatus 2. Through a communication network 3 such as a local area network (LAN), the respective apparatuses which are the image forming apparatus 1 and the external apparatus 2 are connected to each other so as to be capable of data communication.

The image forming apparatus 1 is a so-called multi-function peripheral (MFP) including a copy function, an image capture function and a printer function. As this image forming apparatus 1, there is applicable a tandem-type image processing apparatus that includes photosensitive drums for each color of CMYK, and performs printing by conveying a sheet simultaneously with image formation onto the photosensitive drums. Moreover, the image forming apparatus 1 may be an image processing apparatus that includes only a monochromatic photosensitive drum and forms a monochromatic image. The image forming apparatus 1 forms an image on the sheet based on print job data transmitted from the external apparatus 2, on image data read from an image capture unit such as a scanner provided in the image forming apparatus 1, and on the like.

The external apparatus 2 is a so-called personal computer, and has a function to transmit the print job data to the image forming apparatus 1. In the external apparatus 2, a printer driver program (hereinafter, simply referred to as a printer driver in some case) is installed. By using a function of this printer driver, the external apparatus 2 generates the print job data including data (print request data and the like) of print conditions, page printing control data (image data and the like) and the like, which are applied at the time of the image formation, and then transmit the generated print job data to the image forming apparatus 1. The print job data is data (hereinafter, also referred to as PDL data) in a format of Page Description Language (PDL) such as, for example, PostScript (registered trademark), Printer Control Language (PCL), Portable Document Format (PDF) and XML Paper Specification (XPS). Moreover, in the print job data, the data of the print conditions may be included as a print ticket by a format of Printer Job Language (PJL) or the like.

Figure 2:
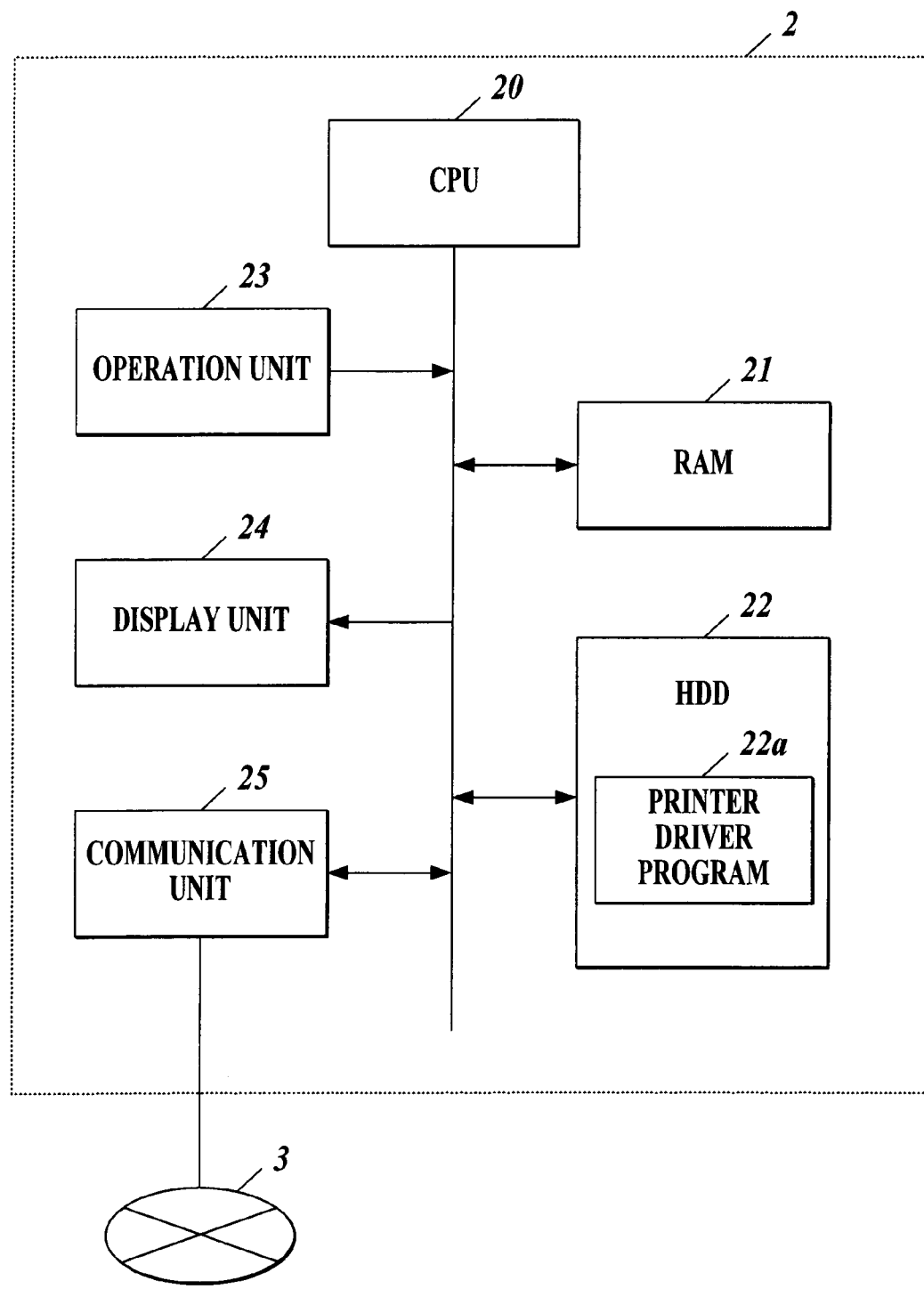
FIG. 2 is a view showing a configuration of an external apparatus.

FIG. 2 shows a configuration of the external apparatus 2.

As shown in FIG. 2, the external apparatus 2 is composed by including, for example: a central processing unit (CPU) 20; a random access memory (RAM) 21; a hard disk drive (HDD) 22; an operation unit 23; a display unit 24; and a communication unit 25.

In response to an operation signal (instruction signal) inputted from the operation unit 23 or to an instruction signal received by the communication unit 25, the CPU 20 reads out a variety of processing programs stored in the HDD 22, expands the processing programs in a work region formed in the RAM 21, and performs various pieces of processing by cooperation with the programs concerned.

Moreover, the CPU 20 reads out a printer driver program 22a from the HDD 22, expands the printer driver program 22a in the RAM 21, and transmits the print job data to the image forming apparatus 1 by cooperation with the program concerned.

The RAM 21 forms the work region that temporarily stores the variety of processing programs to be executed by the CPU 20 and data related to these programs.

The HDD 22 stores a variety of programs, a variety of setting data, image data and the like. Moreover, the HDD 22 stores the printer driver program 22a.

The operation unit 23 is composed by including a keyboard having cursor keys, number input keys, a variety of function keys and the like, a pointing device such as a mouse, and the like. The operation unit 23 outputs, to the CPU 20, the instruction signal inputted by a key operation to the keyboard or a mouse operation.

The display unit 24 is composed of a liquid crystal display (LCD) and the like, and displays an input instruction from the operation unit 23, data and the like in accordance with an instruction of a display signal inputted from the CPU 20.

The communication unit 25 includes a LAN adapter, a router, a terminal adapter (TA), and the like, and transmits and receives data to and from other apparatuses such as the image forming apparatus 1 connected thereto through the communication network 3.

Figure 3:
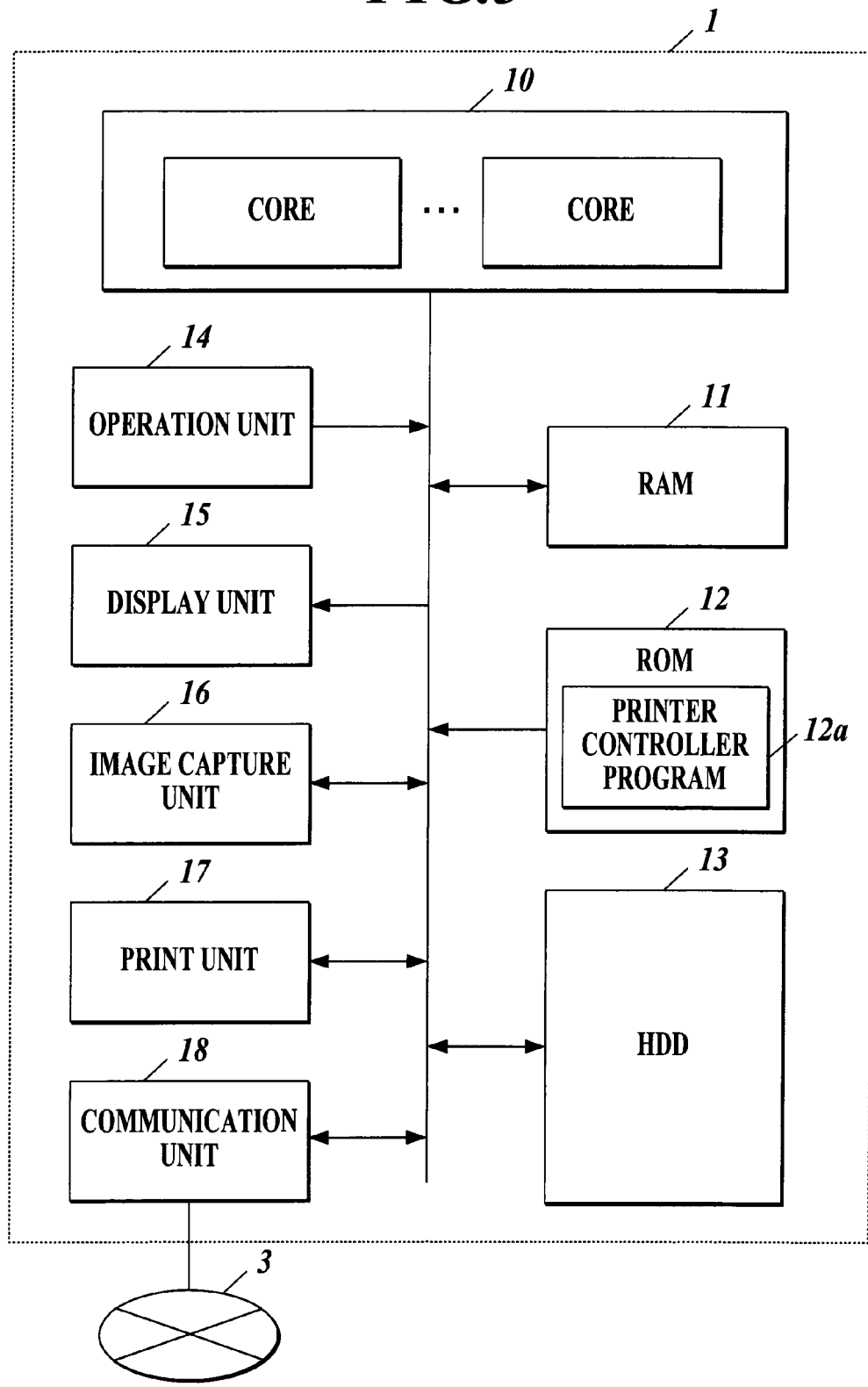
FIG. 3 is a view showing a configuration of an image forming apparatus.

FIG. 3 shows a configuration of the image forming apparatus 1.

As shown in FIG. 3, the image forming apparatus 1 includes: a control unit 10; a RAM 11; a read only memory (ROM) 12; an HDD 13; an operation unit 14; a display unit 15; an image capture unit 16; a print unit 17; a communication unit 18; and the like. The respective units are electrically connected to one another by a bus.

In response to an operation signal (instruction signal) inputted from the operation unit 14 or to an instruction signal received by the communication unit 18, the control unit 10 reads out a variety of processing programs stored in the ROM 12, expands the processing programs in a work region formed in the RAM 11, and performs various pieces of processing by cooperation with the programs concerned. Moreover, the control unit 10 performs a series of processing (image forming processing) regarding the image formation.

In the image forming processing, the PDL data received from the external apparatus 2 by the communication unit 18 is analyzed, and data (hereinafter, also referred to as a display list) in the format of the intermediate language (DL: Display List) is generated. Then, based on the display list, rasterization processing is performed, and data (hereinafter, also referred to as bitmap data) in a bitmap format, which serves as print data, is generated. Then, the generated bitmap data is outputted to the print unit 17.

Accordingly, the image forming apparatus 1 which comprises the control unit that generates the bitmap data as the print data by the execution of the image forming processing can be realized by the print data generation device.

The control unit 10 of this embodiment is composed by using a multi-core processor composed by including a plurality of arithmetic operation parts (hereinafter, referred to as cores) such as processor cores, and can perform plural pieces of processing in parallel. It is assumed that identification numbers (core numbers) are preset for the respective cores of this embodiment. Note that the control unit 10 may be composed so as to exert an equivalent function to that of the multi-core processor by assembling central processing units (CPUs) together in place of the cores.

The RAM 11 forms a work region, a spool region and a sharing storage region, and functions as a storage unit. In the work region, a variety of programs to be executed by the control unit 10, data related to these programs, and the like are expanded temporarily, and the data processed by the variety of programs, and the like are stored temporarily. In the spool region, a variety of data such as the PDL data inputted by the external apparatus 2 and the image capture unit 16 are stored.

The sharing storage region is a region for use at the time when analysis processing and rasterization processing, which will be described later, are executed. In the sharing storage region, the display list generated by the analysis processing, the bitmap data generated by the rasterization processing, and the like are stored temporarily. The sharing storage region includes a rasterization region for use in a course where the rasterization processing is executed.

The rasterization region includes: a region that temporarily stores variables, data and the like for use in the rasterization processing; a region for performing transparency processing for superimposing images on one another and for expanding uncompressed bitmap data; and the like. In the rasterization region, there are: a fixed rasterization region preset in the sharing storage region; and an additional rasterization region to be added appropriately. The fixed rasterization region and the additional rasterization region are regions with predetermined sizes.

Note that the RAM 11 just needs to be a readable/writable recording medium, may be composed of a hard disk drive (HDD), a magnetic random access memory (MRAM), a flash memory or the like, and is not limited to this. Moreover, this RAM 11 may be the one fixedly provided on a control board and the like, or the one freely detachably mounted thereon.

The ROM 12 stores the variety of processing programs to be executed by the control unit 10, a variety of data, and the like. The variety of programs concerned are stored in a form of readable program codes, and the control unit 10 sequentially executes operations which accord to the program codes. Moreover, the ROM 12 stores a printer controller program 12a and the like.

The HDD 13 stores the image data captured by the image capture unit 16, a variety of initial setting data, and the like.

The operation unit 14 includes a variety of keys such as numeric keys, a start key, and a reset key, and outputs a depression signal of a depressed key to the control unit 10. Moreover, the operation unit 14 includes a touch panel formed integrally with the display unit 15, detects a position on the touch panel, which receives abutting by a fingertip of a user, a touch pen and the like, and outputs a position signal to the control unit 10.

The display unit 15 is composed of a liquid crystal display (LCD) provided so as to be covered with the touch panel, and the like. In accordance with a display signal inputted from the control unit 10, the display unit 15 displays a variety of setting screens for inputting a variety of setting conditions, a variety of processing results, and the like.

The image capture unit 16 is a so-called scanner that captures an image of an original and generates image data. The image capture unit 16 includes: a platen glass on which the original is to be mounted; a scanning optical system that scans the image of the original on the platen glass, and forms that image on a CCD image sensor. The image capture unit 16 performs A/D conversion for an image signal generated based on the image of the original, which is captured by the CCD image sensor, and generates the image signal thus subjected to the A/D conversion.

The print unit 17 is a function unit including constituent components necessary to form the image by using an imaging process such as an electrophotographic mode, an electrostatic recording mode, and a heat transfer mode. For example, the print unit 17 includes: an image forming unit having an exposure unit, a development unit, a photosensitive drum, and the like; a fixing unit; a sheet feed unit; a conveyor unit; a sheet discharge unit; a drive control device; and the like. In accordance with an instruction of the control unit 10, the print unit 17 forms an image on a sheet, which is fed from the sheet feed unit, based on the image data generated by the image capture unit 16, the print job data received by the communication unit 18, and the like, and conveys the sheet to the sheet discharge unit.

The communication unit 18 includes a LAN adapter, a router, a terminal adapter (TA), and the like, and transmits and receives data to and from an external instrument such as the external apparatus 2 connected thereto through the communication network 3. For example, the communication unit 18 receives the PDL data from the external apparatus 2.

Next, a description is made of operations of this embodiment.

Figure 4:
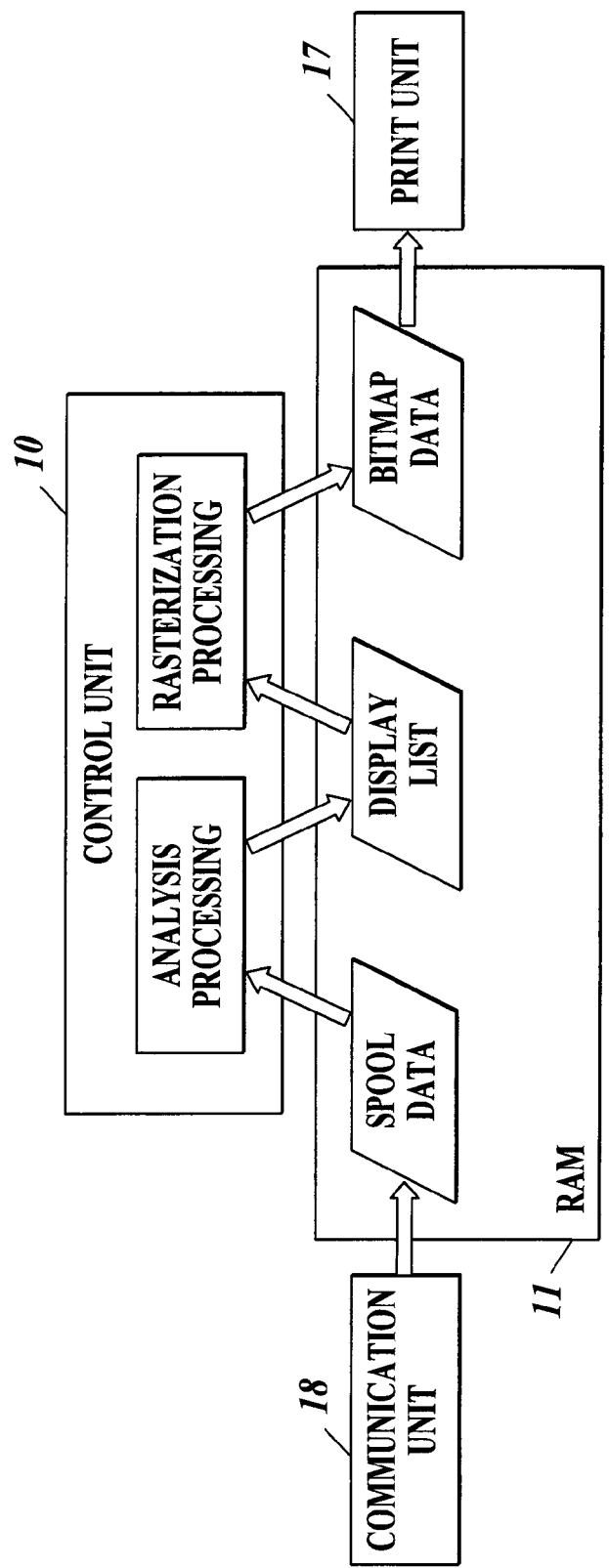
FIG. 4 is a view showing a conceptual view of image forming processing.
Figure 5:
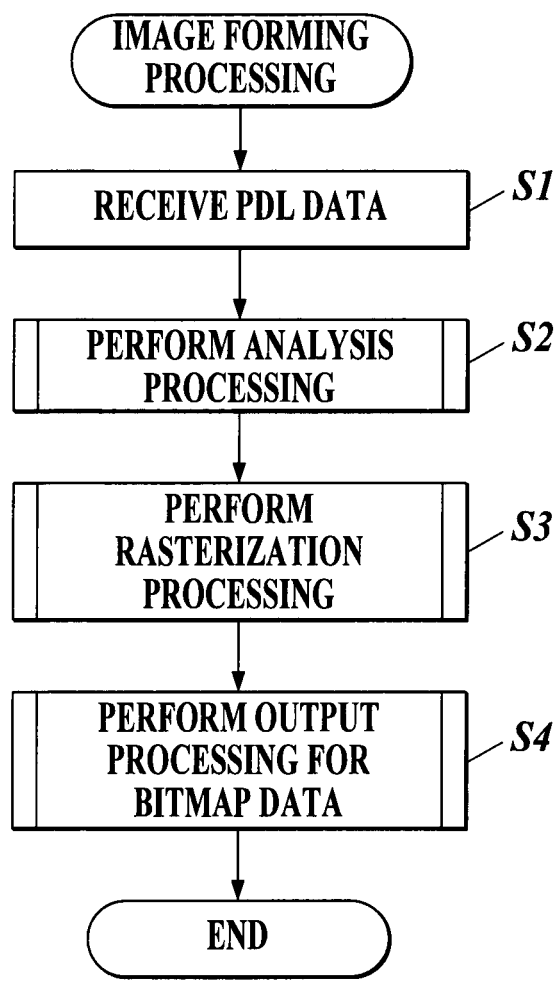
FIG. 5 is a flowchart of the image forming processing.

While referring to FIG. 4 and FIG. 5, a description is made of the image forming processing, which the control unit 10 of the image forming apparatus 1 configured as described above executes by cooperation with the RAM 11, the ROM 12 and the like. FIG. 4 shows a conceptual view of the image forming processing, and FIG. 5 shows a flowchart of the image forming processing. In this embodiment, attention is paid only to the PDL data as the data to be acquired by the control unit 10.

The control unit 10 acquires, through the communication unit 18, the PDL data transmitted from the external apparatus 2, and temporarily stores (spools) the acquired PDL data as spool data in the spool region of the RAM 11 (Step S1).

The control unit 10 reads out the spool data, that is, the PDL data from the spool region of the RAM 11, and executes the analysis processing (Step S2). In the analysis processing, the read-out PDL data for one page is divided into bands of a plurality of lines, and in a unit of the divided bands, the display lists in a language format between the PDL data and the bitmap data are generated. The control unit 10 temporarily stores the generated display lists in the sharing storage region of the RAM 11.

Each of the display lists is data to be generated in response to a feature of an object (text data, graphic data, image data or the like) included in the PDL data. For example, data in a vector format can be mentioned as a display list of the text data or the graphic data, and data in an image format can be mentioned as a display list of the image data.

At the time when the display lists for one page are completed, the control unit 10 reads out the display lists from the RAM 11, and executes the rasterization processing based on the read out display lists (Step S3). In the rasterization processing, the bitmap data divided in the unit of the bands is generated and compressed. The compressed bitmap data (also referred to as compression bitmap data) is sequentially stored in the sharing storage region of the RAM 11.

When bitmap data for one band is completed, the control unit 10 activates the print unit 17 and allows the print unit 17 to start print processing, and thereafter, executes bitmap data output processing (Step S4), in the bitmap data output processing, compression bitmap data of a first band, which is stored in the RAM 11, is extended, and is outputted to the print unit 17. Meanwhile, the control unit 10 continues to generate bitmap data of a second band and after and to store the generated bitmap data in the RAM 11.

In the print unit 17, the image is formed on the sheet based on the bitmap data inputted thereto. The control unit 10 sequentially outputs the compression bitmap data in the unit of the bands, which is stored in the RAM 11, at every predetermined timing.

Note that a processing module to be realized by Steps S1 to S4 shown in FIG. 5 operates in multi tasks, and accordingly, a plurality of pages are processable in parallel; however, for the convenience of description, these Steps S1 to S4 are described in a chronological order, and a description is made of processing to be performed until the image for one page is formed on the sheet. That is to say, such pieces of the processing (the analysis processing, the rasterization processing, the bitmap data output processing) are described along a procedure illustrated for the convenience of description; however, it is defined that the respective pieces the processing are executable in parallel.

Figure 6:
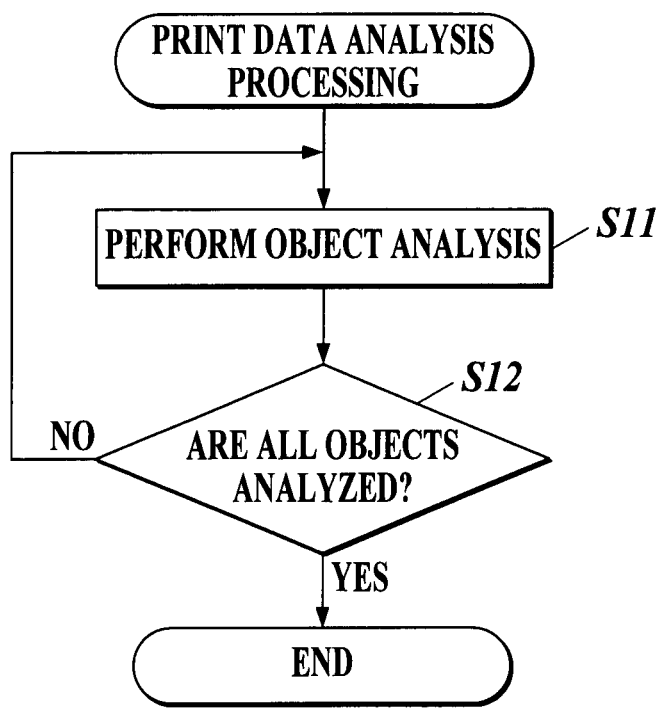
FIG. 6 is a flowchart of analysis processing.

Next, by using FIG. 6, a description is made of specific processing contents of the analysis processing (Step S2). FIG. 6 shows a flowchart of the analysis processing.

The analysis processing shown in FIG. 6 is executed by any core among the plurality of cores which compose the control unit 10.

First, the objects included in the PDL data read out from the RAM 11 are analyzed, one page is divided into the bands of the plurality of lines, and the display lists are generated in the unit of the bands (Step S11). Then, the generated display lists are temporarily stored in the RAM 11.

Next, it is determined whether or not the analysis for all of the objects included in the PDL data for one page is completed (Step S12). In the case where the analysis for all of the objects is completed (Step S12: YES), the analysis processing is ended. Meanwhile, in the case where the analysis for all of the objects is not completed (Step S12: NO), the processing returns to the processing of Step S11, where the next object included in the PDL data for one page is performed.

Next, a description is made of specific processing contents of the rasterization processing (Step S3). The rasterization processing is composed of: tasks (referred to as RAS slaves) of executing such pieces the rasterization processing based on the display lists of the respective bands and generating the bitmap data; and a task (referred to as a RAS master) of managing the RAS slaves and assigning the pieces of the rasterization processing of the respective bands to the RAS slaves. The RAS master is assigned in advance to a preset core (in this embodiment, a core in which the core number is 1). Moreover, identification numbers (RAS slave numbers) are assigned to the RAS slaves. Note that a RAS slave in which the RAS slave number is 1 is also referred to as a fixed RAS slave.

Figure 7:
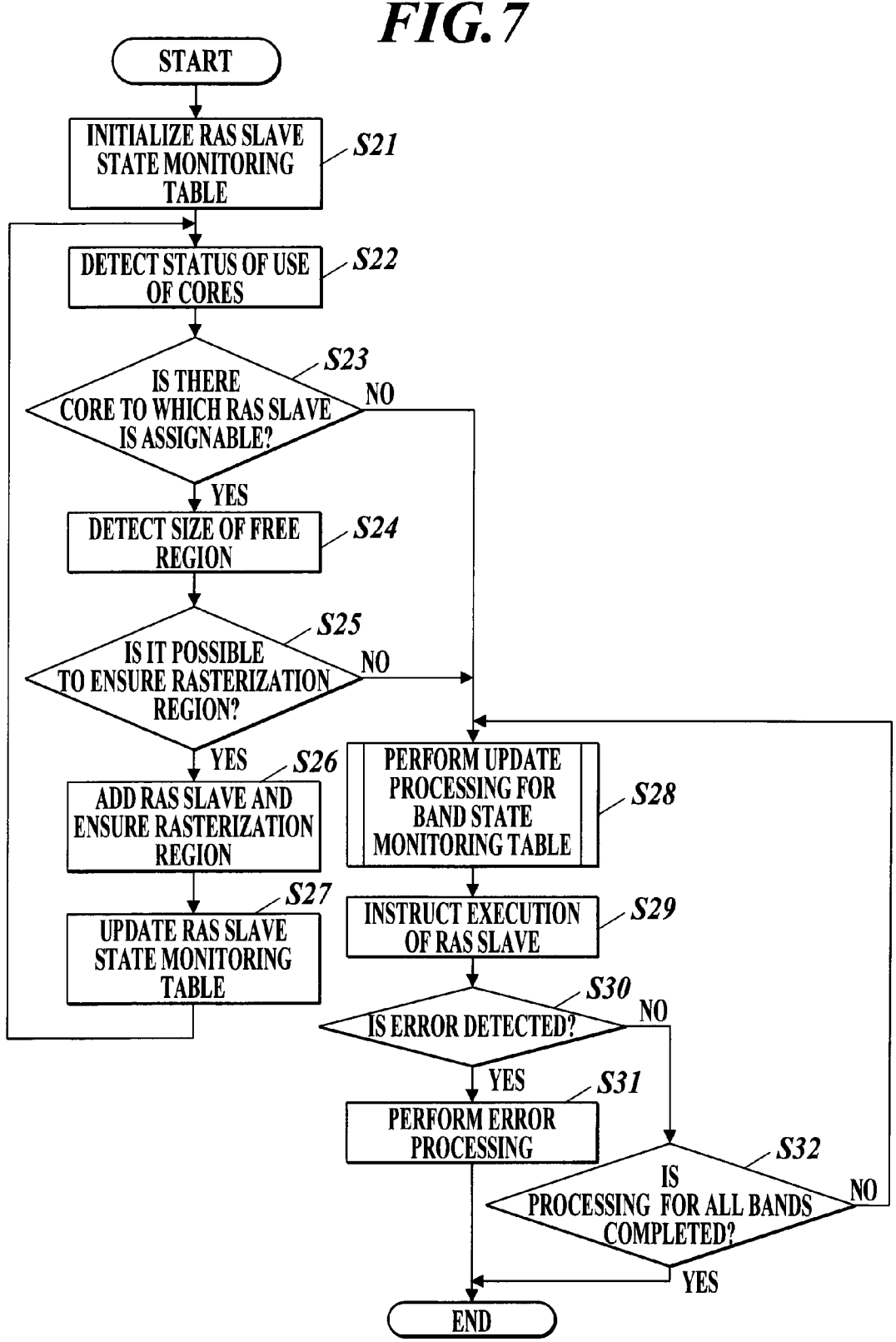
FIG. 7 is a flowchart of a RAS master.

FIG. 7 shows a flowchart of the RAS master.

First, before the processing of the RAS master is executed, for example, in initialization processing to be executed at the time when a power supply of the imaging forming apparatus 1 is turned on, the RAS master is assigned to the preset core (core 1) in which the core number is 1, and a fixed rasterization region to be used by the RAS master concerned is used.

Thereafter, when the display lists for one page are completed, a band state monitoring table and a RAS slave state monitoring table are generated and initialized (Step S21).

Note that the band state monitoring table and the RAS slave state monitoring table are newly generated for each page to be subjected to the rasterization processing.

FIG. 8A shows an example of the band state monitoring table in Step S21, and FIG. 8B shows an example of the RAS slave monitoring table in Step S21.

As shown in FIG. 8A, the band state monitoring table is composed of band numbers and band states corresponding to the band numbers. The band numbers are identification numbers for identifying the respective bands divided by the analysis processing. With regard to the band states, each state of the bands denoted by the band numbers is represented by any of three states, which are: "bitmap is not generated"; "processing is assigned to RAS slave n"; and "bitmap is already generated".

"Bitmap is not generated" represents that the bitmap data is not generated. "Processing is assigned to RAS slave n" represents that the rasterization processing for the band denoted by the band number is already assigned to the RAS slave in which the RAS slave number is n (n is a RAS slave number). "Bitmap is already generated" represents that the bitmap data is already generated.

In Step S21, the band states of all of the bands are initialized to "bitmap is not generated".

As shown in FIG. 8B, the RAS slave state monitoring table is composed of a RAS slave number, a rasterization processing time and a deletion instruction flag, which correspond to each of the core numbers.

Each core number is an identification number for identifying each core that composes the control unit 10. Each RAS slave number is an identification number that represents the RAS slave assigned to the core denoted by the core number.

Each rasterization processing time is an execution time of the rasterization processing in the RAS slave denoted by the RAS slave number. Each deletion instruction flag is a flag that represents whether or not there is an instruction to delete the RAS slave assigned to the core denoted by the core number. Each deletion instruction flag represents that there is an instruction for the deletion in the case of "YES".

In Step S21, initial values are set in all items except that the RAS slave (fixed RAS slave) in which the RAS slave number is 1 is preset in the core (core 1) in which the core number is 1.

After Step S21, a status of use of the plural cores which compose the control unit 10 (Step S22), it is determined whether or not there is a core to which the RAS slave is assignable (Step S23).

In Step S23, a core in an idle state is determined to be the core to which the RAS slave is assignable. Moreover, with regard to a core that is executing processing lower in preset priority than the processing of the RAS slave, such processing executed in the core is stopped, whereby the core concerned is determined to be the core to which the RAS slave is assignable.

Note that a core that is executing processing such as FAX processing higher in priority than the processing of the RAS slave is determined to continuously execute the processing, and not to be the core to which the RAS slave is assignable.

In the case where there is a core to which the RAS slave is assignable (Step S23: YES), a size of a free region is detected in the sharing storage region in the RAM (Step S24), and it is determined whether or not the size of the free region is a size capable of ensuring the rasterization region (Step S25).

In the case where the size of the free region is the size capable of ensuring the rasterization region (Step S25: YES), the RAS slave is additionally generated, and a rasterization region (additional rasterization region) to be used by the additionally generated RAS slave (additional RAS slave) is ensured in the sharing storage region (Step S26). Then, the RAS slave state monitoring table is updated (Step S27), and the processing returns to Step S22.

In Step S27, to the RAS slave number that corresponds to the core number of the core to which the RAS slave is assignable, the core being determined in Step S23, there is assigned an identification number of the RAS slave additionally generated in Step S26.

In the case where there is not a core to which the RAS slave is assignable (Step S23: NO), or in the case where the size of the free region is not the size capable of ensuring the rasterization region (Step S25: NO), update processing (refer to FIG. 9) for the band state monitoring table is executed (Step S28).

In the update processing for the band state monitoring table, which is to be executed in Step S28, one band is assigned to each of the RAS slaves.

After Step S28, an execution instruction for the RAS slave is outputted to the core two which the RAS slave is assigned (Step S29). Then, it is determined whether or not an error is detected from any of the RAS slaves (Step S30).

In Step S30, the error is detected in the case where ay of the RAS slaves performs "error setting" to be described later.

In the case where the error is detected (Step S30: YES), the processing for all of the bands is discontinued, error processing is executed (Step S31), and the processing for the RAS master is ended.

The error processing is deletion of the additionally generated RAS slave, release of the rasterization region (additional rasterization region) ensured so as to correspond to the additionally generated RAS slave, and the like. The error processing is processing for returning the RAS master to a state before the start of the processing therefor.

In the case where the error is not detected (Step S30: NO), it is determined whether or not the generation of the bitmap data for all of the bands which compose one page is completed (Step S32). In the case where the generation of the bitmap data for all of the bands is not completed (Step S32: NO), the processing returns to the processing of Step S28. In the case where the generation of the bitmap data for all of the bands is completed (Step S32: YES), the processing for the RAS master is ended.

Figure 9:
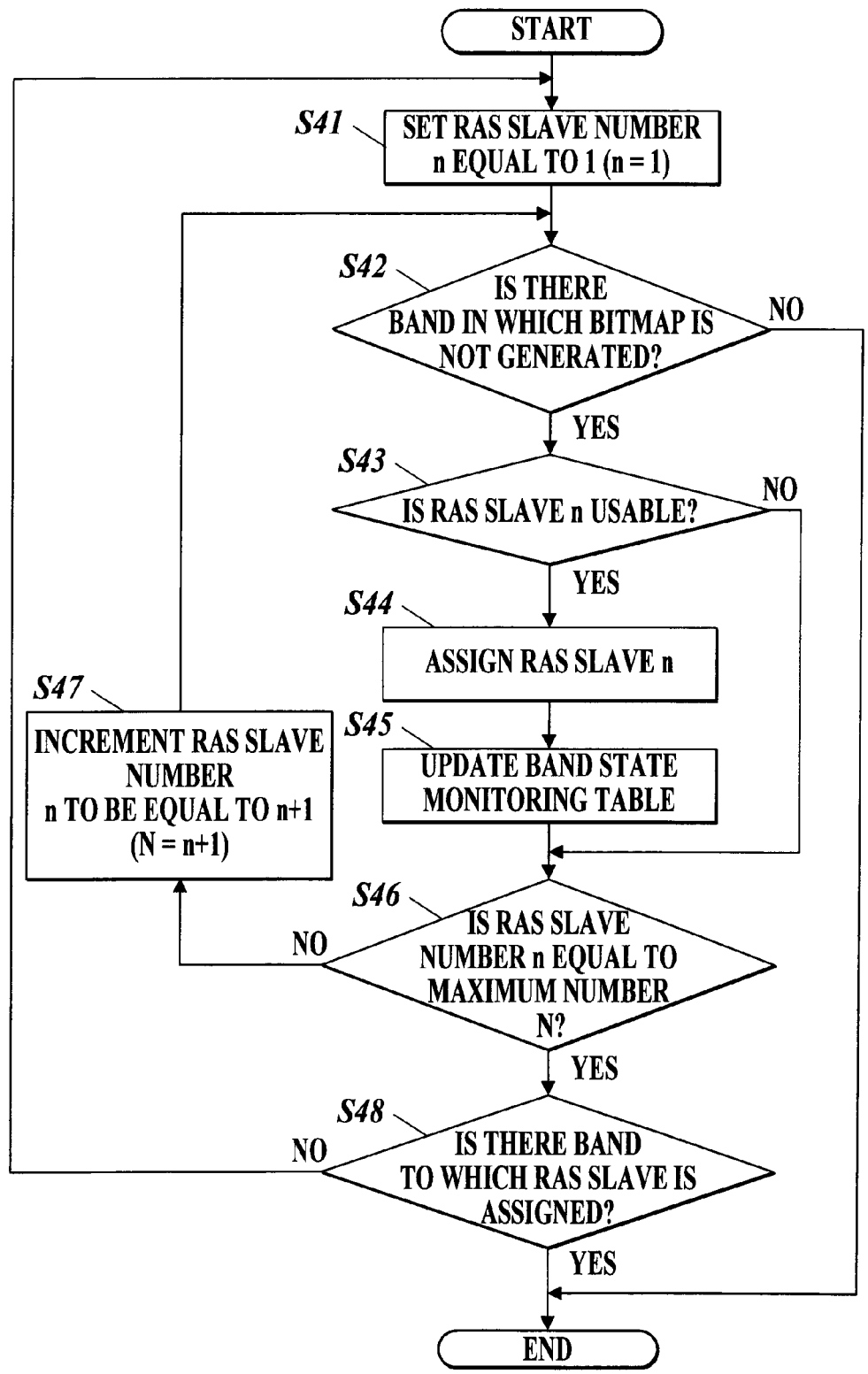
FIG. 9 is a flowchart of update processing for the band state monitoring table.

FIG. 9 shows a flowchart of the update processing for the band state monitoring table, which is to be executed in Step S28.

First, among the RAS slave numbers in the RAS slave state monitoring table, the RAS slave number n to be referred to is set at 1 (Step S41). Moreover, the band state monitoring table is referred to, and it is determined whether or not there is a band in which the bitmap is not generated (Step S42). In the case where there is not a band in which the bitmap is not generated (Step S42: NO), the update processing for the band state monitoring table is ended.

In the case where there is a band in which the bitmap is not generated (Step S42: YES), it is determined whether or not the RAS slave (hereinafter, referred to as the RAS slave n) in which the RAS slave number is n is usable (Step S43).

In Step S43, in the case where the core to which the RAS slave n is assigned is in an idle state, in the case where the core concerned is performing the processing lower in priority than the processing for the RAS slave, and is capable of the execution of the RAS slave by stopping the processing executed therein, it is determined that the RAS slave n is usable.

In the case where the RAS slave n is usable (Step S43: YES), the band in which the bitmap is not generated is assigned to the RAS slave n (Step S44), and the band state monitoring table is updated (Step S45).

In the case where the RAS slave n is not usable (Step S43: NO), or after Step S45, it is determined whether or not the RAS slave number n of the RAS slave n coincides with a RAS slave maximum number N (Step S46). Note that the RAS slave maximum number N is an additional value of the number of additionally generated RAS slaves and the number of fixed RAS slaves.

In the case where the RAS slave number n does not coincide with the RAS slave maximum number N (Step S46: NO), the RAS slave number n is incremented (n=n+1) (Step S47), and the processing returns to the processing of Step S42.

In the case where the RAS slave number n coincides with the RAS slave maximum number (Step S46: YES), the band state monitoring table is referred to, and it is determined whether or not there is a band to which the RAS slave is assigned (Step S48).

In the case where there is not a band to which the RAS slave is assigned (Step S48: NO), the processing returns to the processing of Step S41. In the case where there is a band to which the RAS slave is assigned (Step S48: YES), the update processing for the band state monitoring table is ended.

FIG. 10A shows an example of the band state monitoring table when the band state monitoring table is ended, and FIG. 10B shows an example of the RAS slave monitoring table when the update processing for the band state monitoring table is ended.

As shown in FIG. 10B, the RAS slave in which the RAS slave number is 1 is assigned to the core in which the core number is 1. Then, as shown in FIG. 10A, the RAS slave (RAS slave 1) in which the RAS slave number is 1 is assigned to the band in which the band number is 1. In a similar way, as shown in FIG. 10B, the RAS slaves in which the RAS slave numbers are 2 and 3 are assigned to the cores in which the core numbers are 2 and 4, respectively. Then, as shown in FIG. 10A, the RAS slaves (RAS slave 2, RAS slave 3) in which the RAS slave numbers 2 and 3 are assigned to the bands in which the band numbers 2 and 3.

Note that, in FIG. 10A, at the stage where the RAS slave is assigned to the band in which the band number is 3, the usable RAS slave disappears. Accordingly, the RAS slave is not assigned to the band in which the band number is 4 and after, where the band state is left in "bitmap is not generated".

Figure 11:
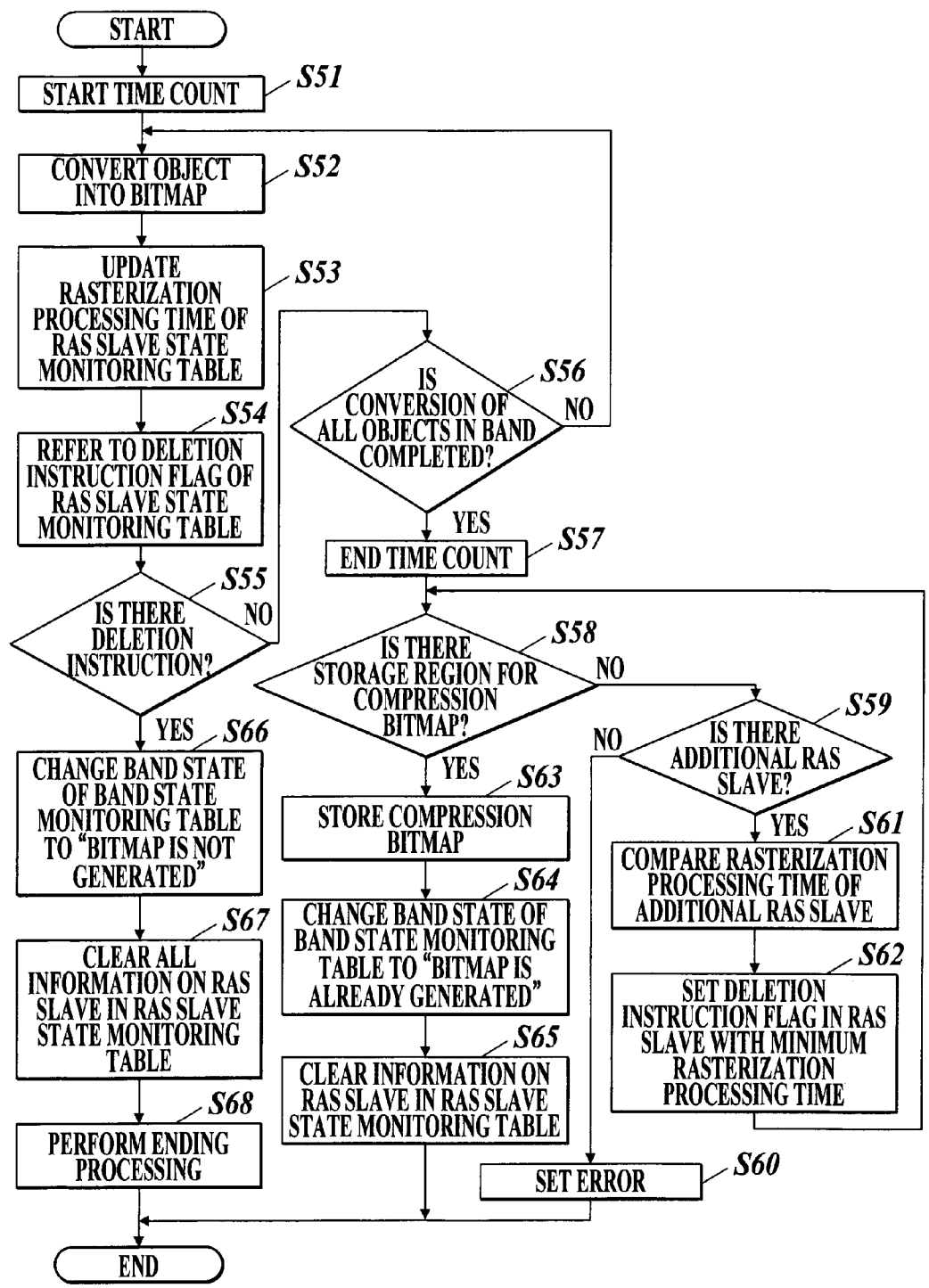
FIG. 11 is a flowchart of a RAS slave.

FIG. 11 shows a flowchart of the RAS slaves.

Processing shown in FIG. 11 is processing to be executed by each of the RAS slaves which receive the execution instruction from the RAS master, and is started at timing when the RAS slave receives the execution instruction from the RAS master. Moreover, the processing of the RAS slave is executed in such a manner that a record in the RAS slave state monitoring table including the RAS slave number set in the RAS slave and a record in the bas state monitoring table are referred to.

Upon receiving the execution instruction from the RAS master, there is started a time count for an execution time of the rasterization processing from the start of the generation of the bitmap data of the band assigned to the band state monitoring table to the end thereof (Step S51). Then, the display list of one object in the assigned band is converted into bitmap data (Step S52).

After Step S52, the rasterization processing time of the RAS slave state monitoring table is updated to a count time at the time when the conversion of the object in Step S52 is ended (Step S53). Then, the deletion instruction flag of the RAS slave state monitoring table is referred to (Step S54), and it is determined whether or not there is a deletion instruction (Step S55).

In the case where there is not a deletion instruction (Step S55: NO), it is determined whether or not conversion of all of the objects in the assigned band into the bitmap data is completed (Step S56). In the case where the conversion of all of the objects in the band into the bitmap data is not completed (Step S56: NO), the processing returns to the processing of Step S52.

In the case where the conversion of all of the objects in the band into the bitmap data is completed (Step S56: YES), the time count is ended (Step S57).

FIG. 12 shows an example of the RAS slave state monitoring table when the processing of Step S57 is ended in the slave in which the RAS slave number is 1.

As shown in FIG. 12, it is understood that, in the slave in which the RAS slave is 1, a time required for the rasterization processing for the assigned band is 10 [ms].

After Step S57, the generated bitmap data for one band is compressed, and it is determined whether or not there is a free region, which is capable of storing the compressed bitmap data (compression bitmap data), in the sharing storage region in the RAM (Step S58).

In the case where there is not a free region, which is capable of storing the compression bitmap data, in the sharing storage region in the RAM, and the free region is insufficient (Step S58: NO), it is determined whether or not there are additional RAS slaves (Step S59). Each of the additional RAS slaves is a RAS slave in which the RAS slave number is other than 1. In Step S59, items of the RAS slave numbers in the RAS slave state monitoring table are referred to, and it is determined whether or not there is a RAS slave (additional RAS slave) in which the RAS slave number is other than 1. Note that the RAS slave in which the RAS slave number is 1 is the fixed RAS slave.

In the case where there is not an additional slave (Step S59: NO), it is impossible to further continue the rasterization processing owing to such a lack of the free region, and accordingly, an occurrence of an error is set (Step S60), and the processing of the RAS slave is discontinued and ended.

In the case where there is an additional slave (Step S59: YES), the rasterization processing time of each of the additional RAS slaves is compared with the others (Step S61). Then, it is decided that the additional RAS slave in which the rasterization processing time is minimum be deleted, and the deletion instruction flag of the additional RAS slave concerned is set at "YES" (Step S62), and the processing returns to the processing of Step S58.

FIG. 13 shows an example of the RAS slave state monitoring table when the processing of Step S62 is ended in the slave in which the RAS slave number is 1.

As shown in FIG. 13, between the additional RAS slave in which the RAS slave number is 2 and the additional RAS slave in which the RAS slave number is 3, the rasterizing processing time is shorter in the additional RAS slave in which the RAS slave number is 3 than in the additional RAS slave in which the RAS slave number is 2. Hence, the deletion instruction flag for the additional RAS slave in which the RAS slave number is 3 is set at "YES". The additional RAS slave for which the deletion flag is set at "YES" is thereafter deleted, and the rasterization region assigned to the additional RAS slave is released, whereby a new free region is generated.

In the case where there is a free region, which is capable of storing the compression bitmap data, in the sharing storage region in the RAM (Step S58: YES), the compression bitmap data is stored in the sharing storage region (Step S63). Then, the band state of the band state monitoring table is changed to "bitmap is already generated" (Step S64). Then, information on the rasterization processing time and the deletion instruction flag in the record of the RAS slave in the RAS slave state monitoring table is cleared (initialized) (Step S65), and the processing of the RAS slave is ended.

Meanwhile, in the case where there is a deletion instruction (Step S55: YES), the band state of the band state monitoring table is changed to "bitmap is not generated" (Step S66), and information on all items of the RAS slave number, rasterization processing time and deletion instruction flag of the RAS slave in the RAS slave state monitoring table is cleared (initialized) (Step S67).

Note that, in Step S68, in the case of the fixed RAS slave in which the RAS slave number is 1, the RAS slave number is not cleared, and maintains a state of being 1.

After Step S67, ending processing is executed (Step S68), so that the processing of RAS slave is ended. In the ending processing, deletion of the bitmap data which is in the process of being generated, release of the assigned rasterization region, deletion of the RAS slave itself, and the like are performed.

In the slave in which the RAS slave number is 3, FIG. 14A shows an example of the band state monitoring table when the processing of Step S66 after Step S55: YES is ended, and FIG. 14B shows an example of the RAS slave state monitoring table when the processing of Step S67 is ended.

As shown in FIG. 14A, the band state corresponding to 3 of the band number in the band state monitoring table is changed from "assigned to RAS slave 3" (refer to FIG. 10B) to "bitmap is not generated".

Moreover, as shown in FIG. 14B, the information (RAS slave number, rasterization processing time, deletion instruction flag) regarding the RAS slave in which the RAS slave number is 3, the information being assigned to the core in which the core number is 4 in the RAS slave state monitoring table, is cleared (initialized).

In the slave in which the RAS slave number is 1, FIG. 15A shows an example of the band state monitoring table when the processing of Step S64 is ended after the slave in which the RAS slave number is 3 is deleted, and FIG. 15B shows an example of the RAS slave state monitoring table when the processing of Step S65 is ended.

As shown in FIG. 15A, the band state corresponding to 1 of the band number in the band state monitoring table is changed from "assigned to RAS slave 1" (refer to FIG. 14A) to "bitmap is already generated".

Moreover, as shown in FIG. 15B, the information on the rasterization processing and the deletion instruction flag in the record of the RAS slave 1 (in which the RAS slave number is 1) in the RAS slave state monitoring table is cleared (initialized).

FIG. 16A to FIG. 16J show conceptual views of the inside of the sharing storage region. A description is made of addition and deletion of the rasterization region at the time when the rasterization processing is executed.

Figure 16A:
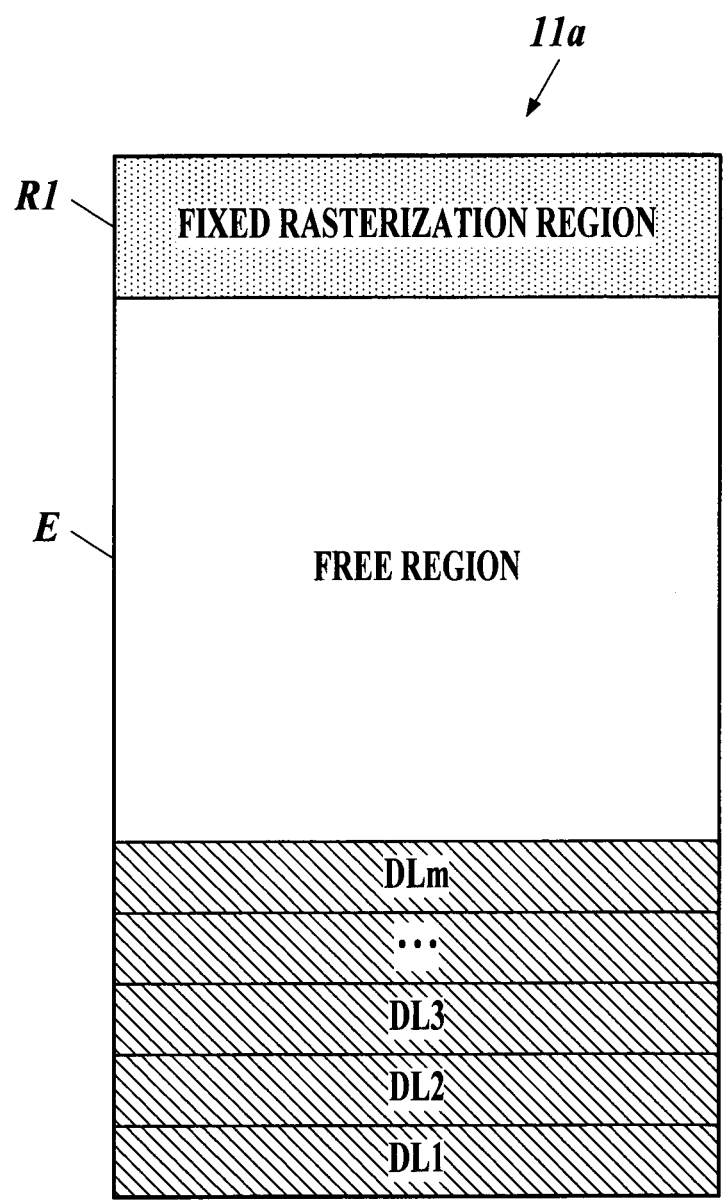

When the rasterization processing is started, in a sharing storage region 11a, there exist: a region in which display lists DL1 to DLm for one page are stored; and a fixed rasterization region R1 to be used by the fixed RAS slave (RAS slave 1) (refer to FIG. 16A).

Next, the RAS slaves are additionally generated based on the status of use of the cores and on a size of a free region E, and in addition, the additional rasterization regions to be used by the additionally generated RAS slaves are ensured in the sharing storage region. In the sharing storage region 11a, additional rasterization regions R2 and R3 to be used by the additional RAS slaves (RAS slaves 2 and 3) are ensured (refer to FIG. 16B).

Figure 16C:
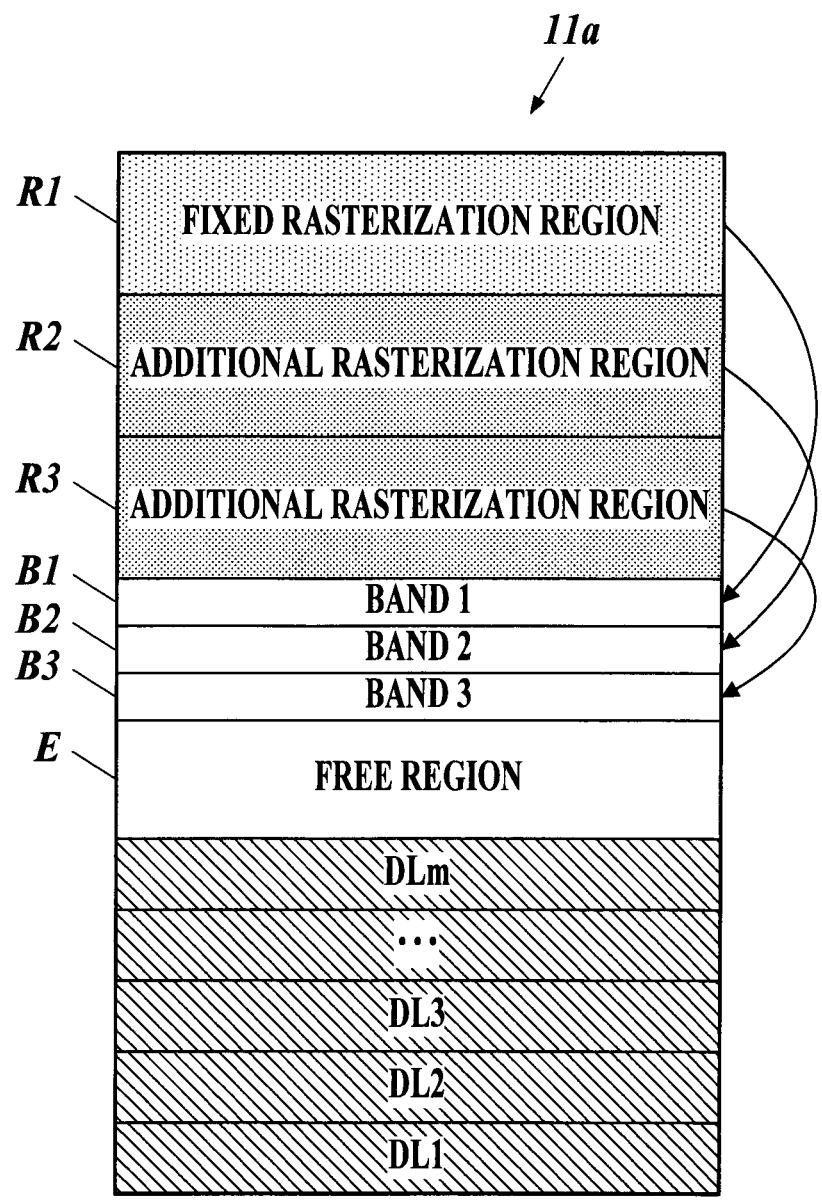
Figure 16D:
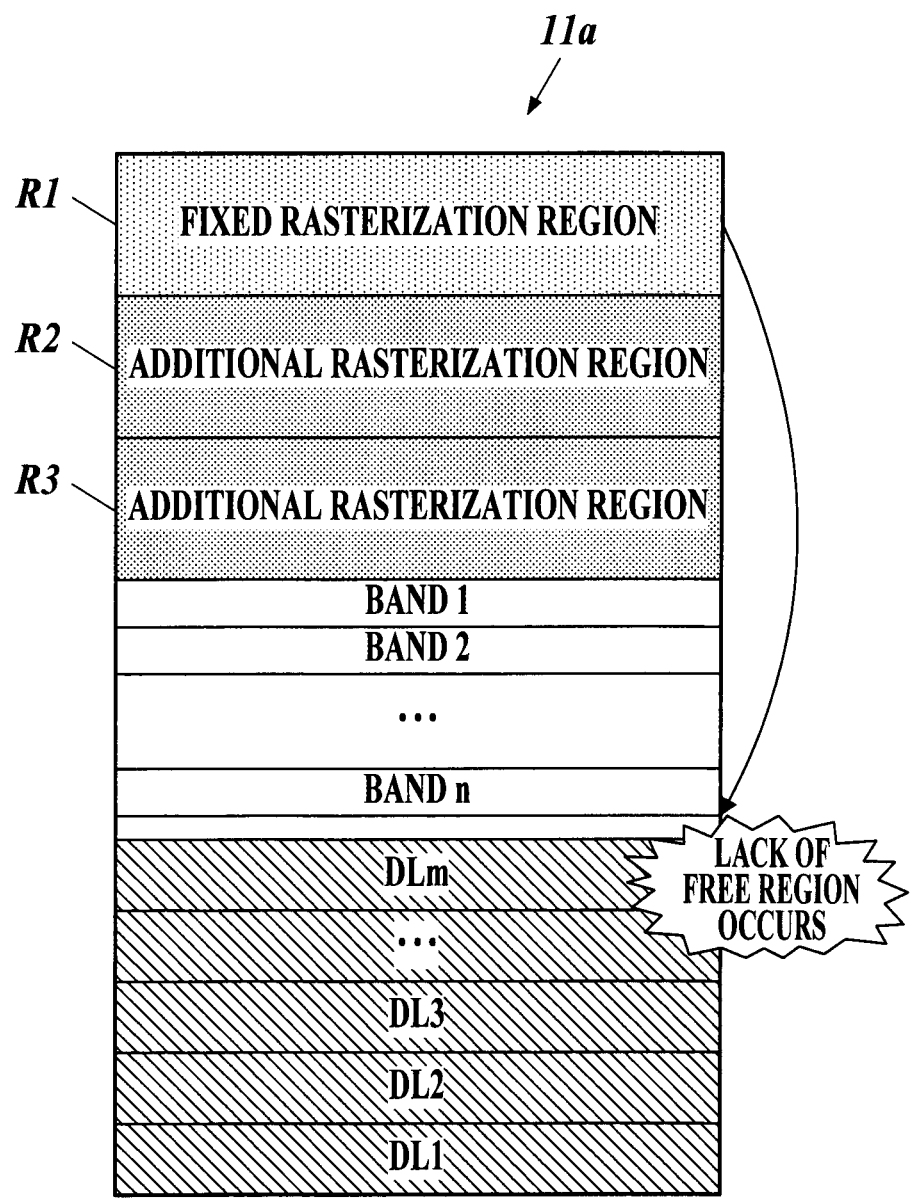

Thereafter, when the execution instruction is outputted to each of the RAS slaves, then in each of the RAS slaves, the display lists of the bands assigned thereto are converted into the bitmap data, and pieces of compression bitmap data B1, B2 and B3 for one band are generated, and are stored in the sharing storage region (refer to FIG. 16C).

Figure 16E:
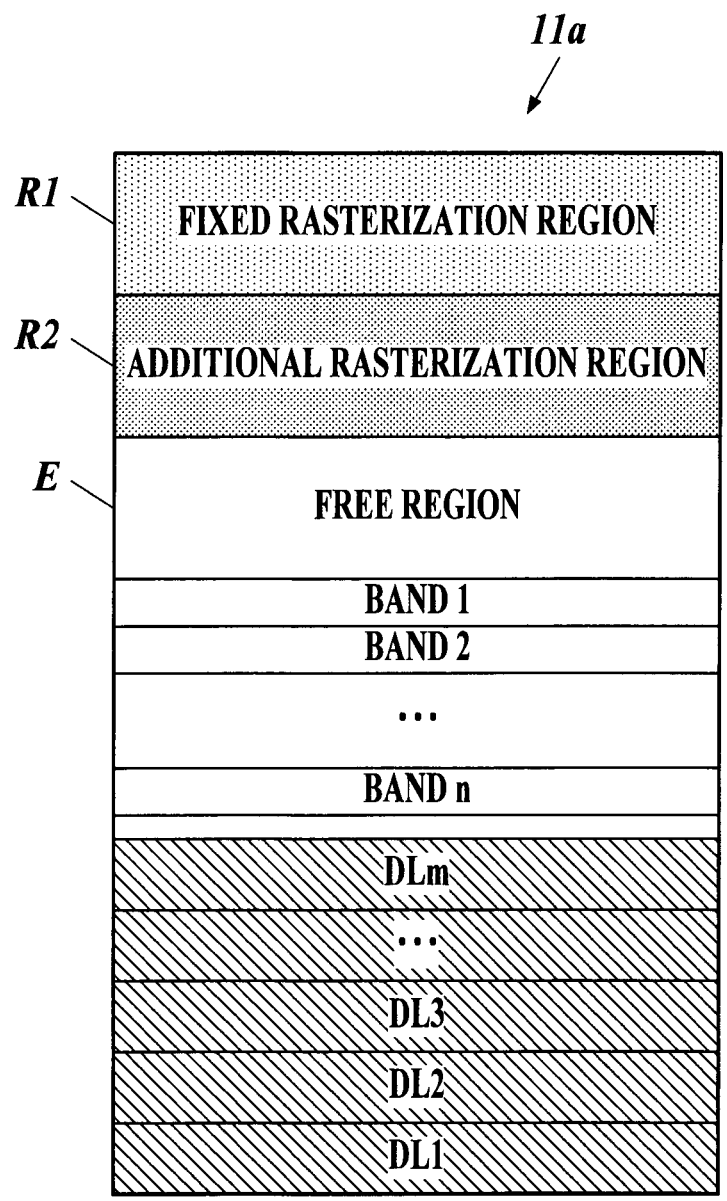
FIG. 16E to FIG. 16H are conceptual views of the inside of the sharing storage region.
Figure 16F:
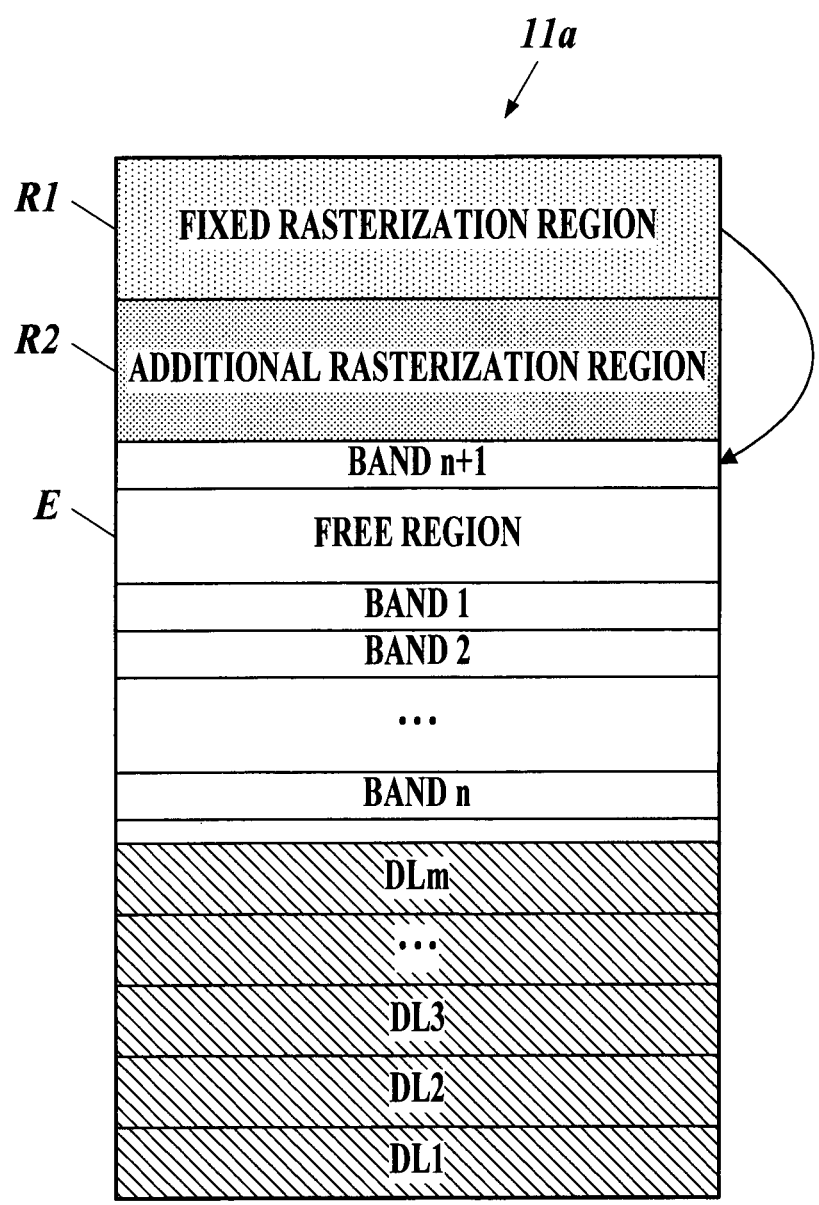
Figure 16G:
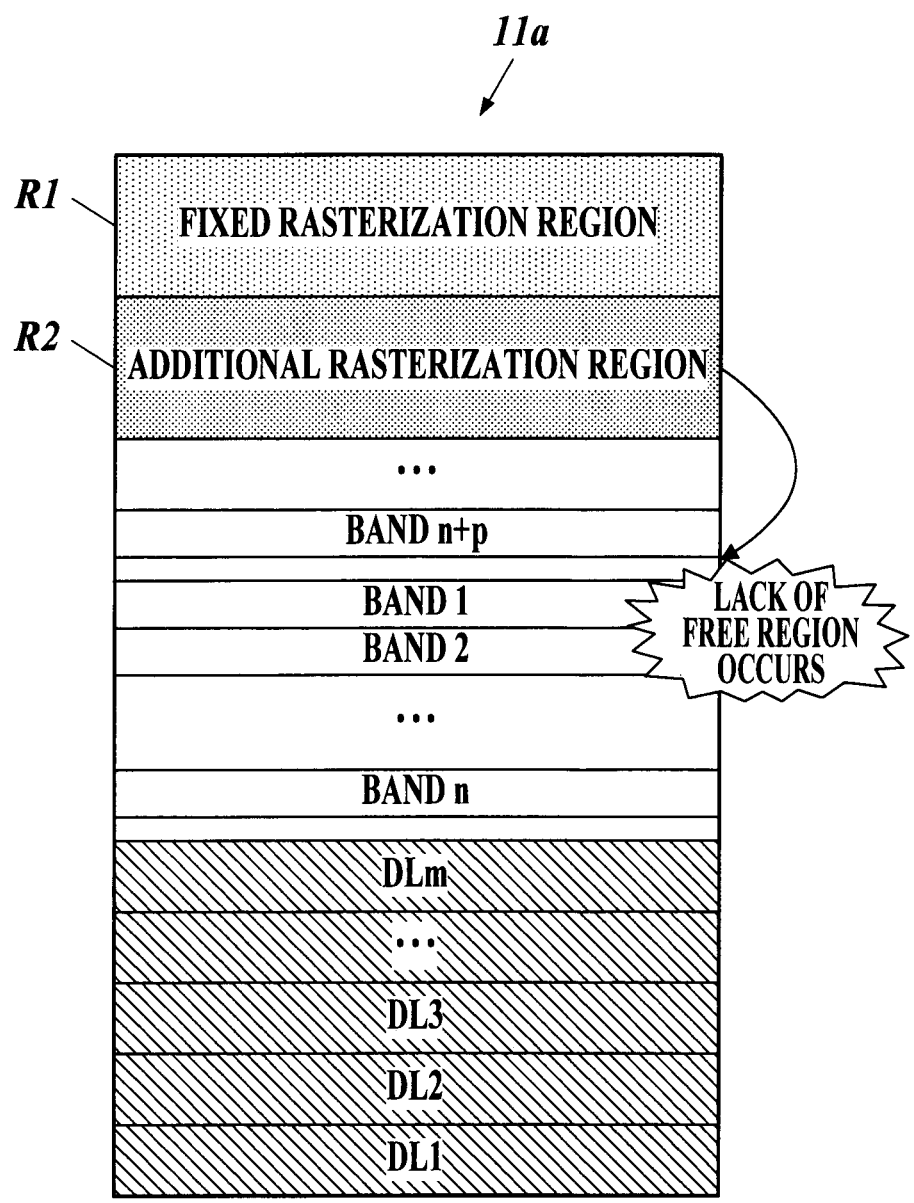
Figure 16H:
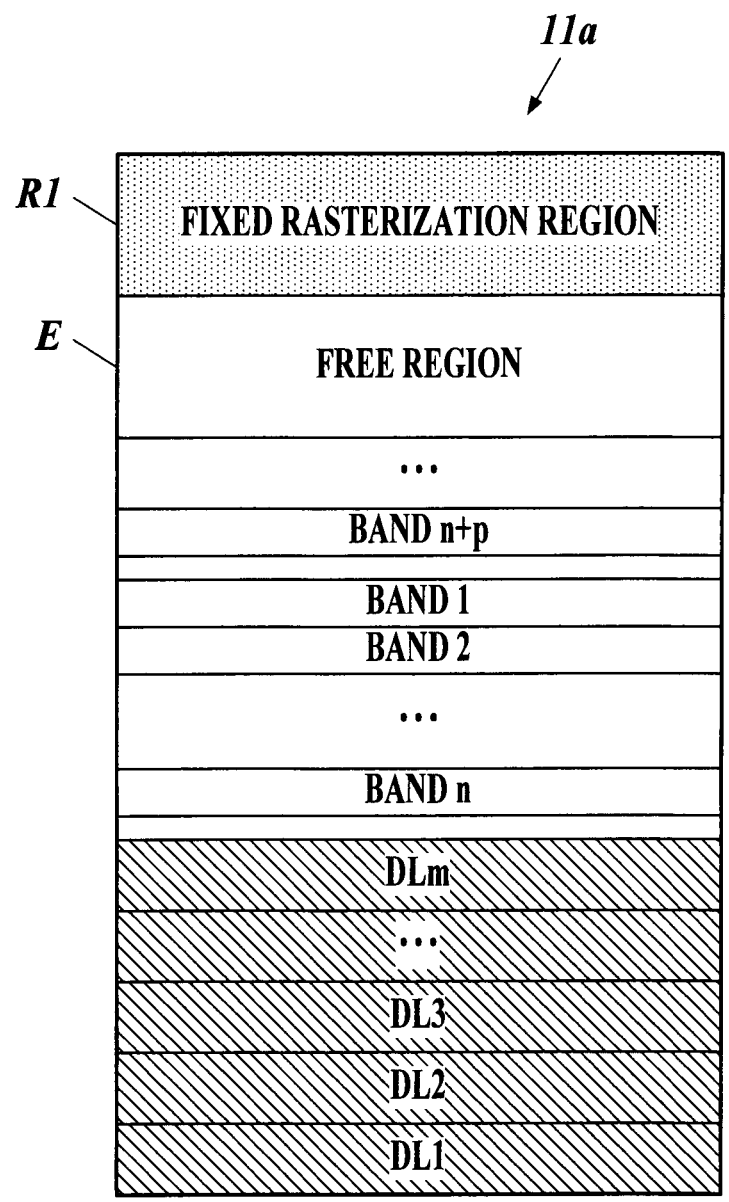

At the time of storing the compression bitmap data, in the case where the free region E that stores the compression bitmap data becomes insufficient (refer to FIG. 16D), the additional RAS slave in which the rasterization time is the minimum among the additional RAS slaves is deleted, and in addition, the additional rasterization region R3 used by the additional RAS slave thus deleted is released, and a size of the free region E is extended (refer to FIG. 16E). Then the compression bitmap data will be stored in the free region E extended in such a manner that the rasterization region R3 is released (refer to FIG. 16F).

Figure 16I:
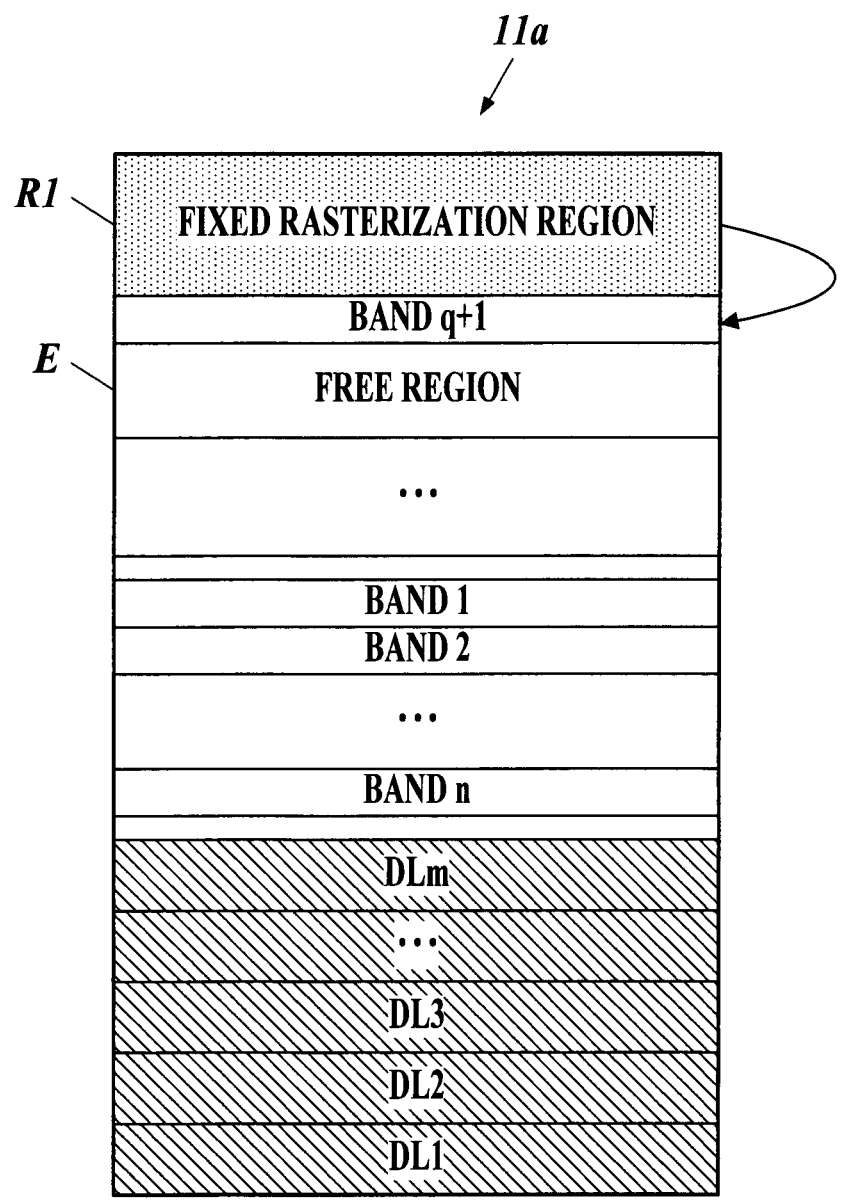
FIG. 16I and FIG. 16J are conceptual views of the inside of the sharing storage region.
Figure 16J:
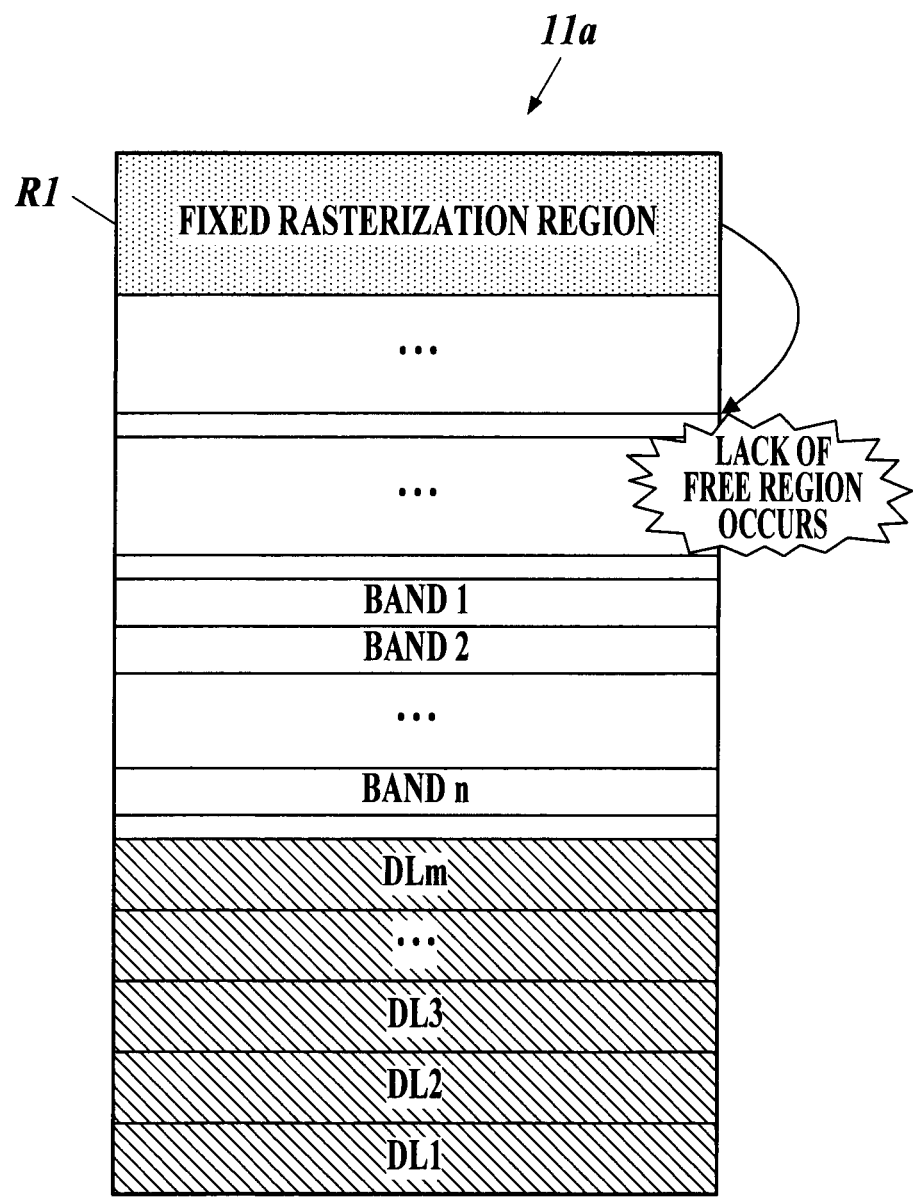

In the case where such a lack of the free region occurs one more time (refer to FIG. 16G), the additional rasterization region R2 is released following the deletion of the additional RAS slave as mentioned above, whereby the size of the free region E is extended (refer to FIG. 16H), and the compression bitmap data will be stored in the extended free region E (refer to FIG. 16I).

Thereafter, in the case where there is not an additional RAS slave to be deleted even if the free region becomes insufficient (refer to FIG. 16J), it is impossible to further continue the rasterization processing, and accordingly, the error processing is executed, and the processing is ended.

As described above, in accordance with this embodiment, the cores which execute the rasterization processing by the RAS slaves are set based on the status of use of the cores and on the status of the free region of the sharing storage region in the RAM, and the rasterization processing can be executed for each of the set cores. Accordingly, the plurality of cores and the memory region in the RAM can be used effectively, and efficiency enhancement of the rasterization processing can be achieved. Therefore, the generation efficiency of the print data can be enhanced.

Moreover, in the case where the free region in the sharing storage region becomes insufficient, the number of cores which execute the rasterization processing by the RAS slaves is reduced, and the rasterization region for use in executing the rasterization processing concerned is reduced (released), whereby the new free region will be generated, and the stop of the rasterization processing owing to the lack of the free region can be prevented.

In particular, the RAS slave by the core in which the execution time of the rasterization processing is the minimum is deleted, and the rasterization region for use in executing the rasterization processing concerned is reduced (released), whereby the new free region can be generated. Accordingly, a waste in executing the rasterization processing can be suppressed to the minimum, and an influence on the efficiency enhancement of the rasterization processing by the reduction of the RAS slaves which execute the rasterization processing can be reduced.

Moreover, for the core that is in the idle state or is executing the processing lower in preset priority than the rasterization processing, there can be performed: setting as the core that executes the RAS slave; and setting on the rasterization region where the rasterization processing is to be executed.

Furthermore, to the core that executes the rasterization processing by the RAS slave, the bands for which the rasterization processing is to be executed are assigned, and the rasterization processing can be executed in the unit of the bands. Accordingly, the rasterization processing for one page can be executed in parallel in the unit of the bands, the reduction of the generation processing time of the print data per page can be achieved, and the generation efficiency of the print data can be enhanced.

MODIFICATION EXAMPLE

Figure 17:
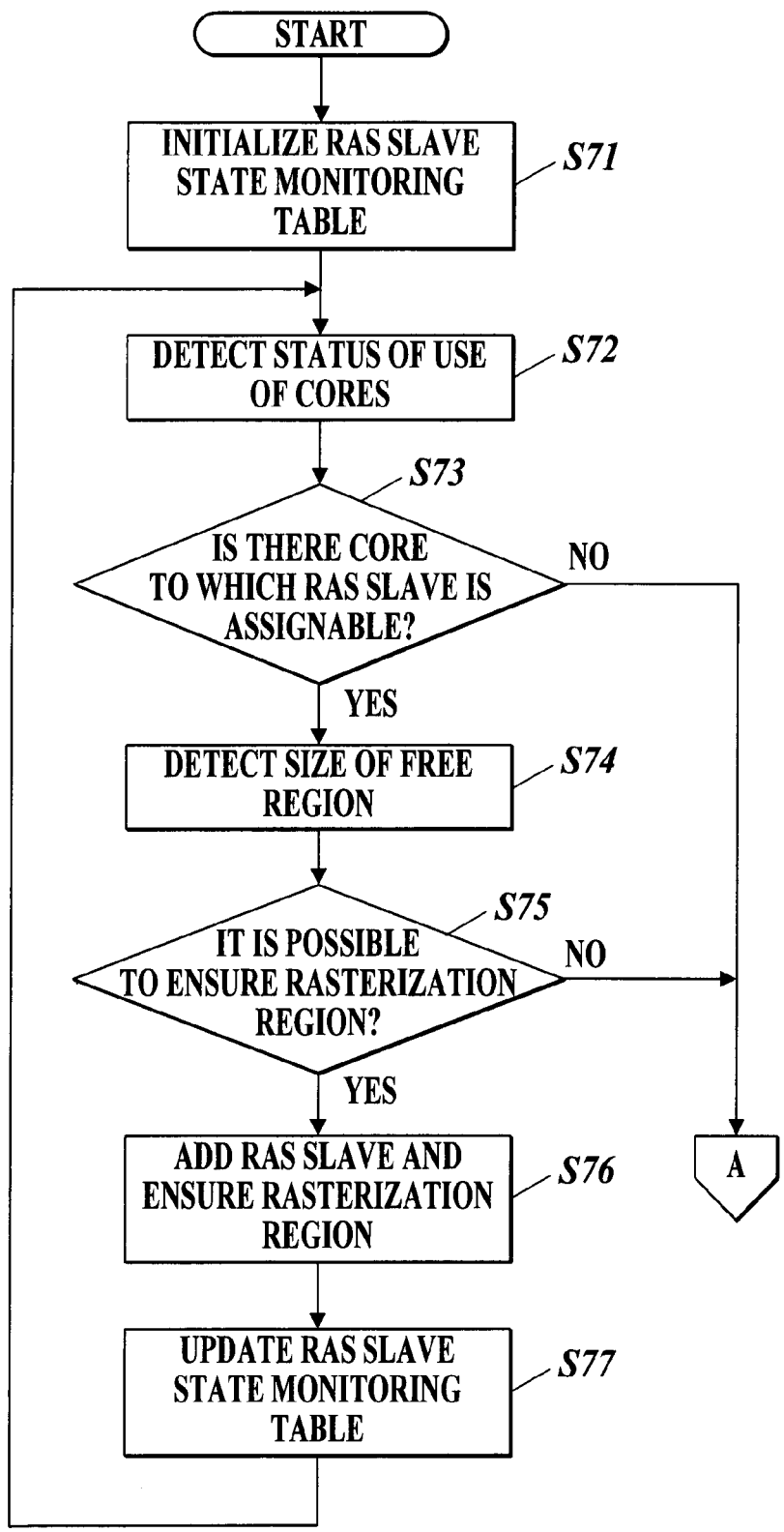
FIG. 17 is a flowchart of a modification example of the RAS mater.
Figure 18:
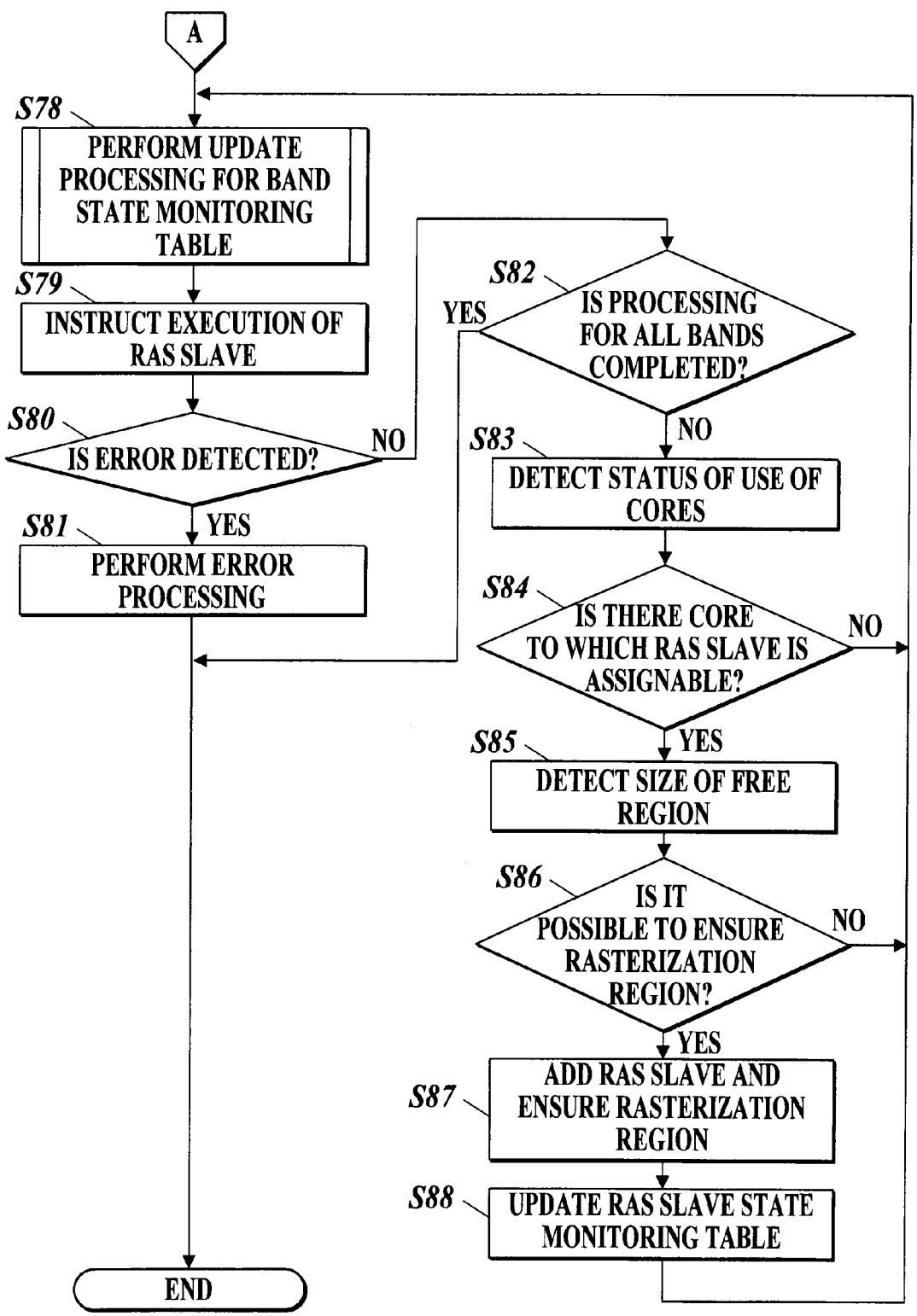
FIG. 18 is a flowchart of the modification example of the RAS master (continued from FIG. 17).

FIG. 17 and FIG. 18 show flowcharts of a modification example of the RAS master.

Processing for the RAS master, which is shown in FIG. 17 and FIG. 18, is different from the processing for the RAS master, which is shown in FIG. 7, in that it is possible to add the RAS slave until the generation processing for the bitmap of all the bands which compose one page is completed.

Steps S71 to S82 are similar to Steps S21 to S32 shown in FIG. 7, and accordingly, a description thereof is omitted.

In the case where the generation processing for the bitmap of all the bands is not completed (Step S82: NO), the status of use of the plurality of cores which compose the control unit 10 is detected (Step S83), and it is determined whether or not there is a core to which the RAS slave is assignable (Step S84).

Note that, since Steps S83 and S84 are similar to Steps S22 and S23 shown in FIG. 7, a detailed description thereof is omitted.

In the case where there is a core to which the RAS slave is assignable (Step S84: YES), a size of the free region is detected in the sharing storage region in the RAM (Step S85), and it is determined whether or not the size of the free region is the size capable of ensuring the rasterization region (Step S86).

In the case where the size of the free region is the size capable of ensuring the rasterization region (Step S86: YES), RAS slave is additionally generated, and a rasterization region (additional rasterization region) that is used by the additionally generated RAS slave (additional RAS slave) is ensured in the sharing storage region (Step S87). Then, the RAS slave state monitoring table is updated (Step S88), the processing returns to the processing of Step S78, where the update processing of the band state monitoring table is executed.

In the case where there is not a core to which the RAS slave is assignable (Step S84: NO), or in the case where the size of the free region is not the size capable of ensuring the rasterization region (Step S86: NO), the processing returns to the processing of Step S78, where the update processing for the band state monitoring table is executed.

The execution instruction is outputted to the RAS slave by the processing for the RAS master, which is shown in FIG. 17 and FIG. 18, and thereafter, in the case where the free region occurs in the sharing storage region since printing for a page processed ahead thereof is completed, and so on, then the RAS slave can be further additionally generated. Moreover, even in the case where the RAS slave is deleted owing to the lack of the free region, in the case where the free region occurs one more time, then the RAS slave can be added one more time. Hence, the enhancement of the processing efficiency of the rasterization processing for one page can be further achieved.

Hence, in accordance with the modification example, in the case where the rasterization processing for all the bands which compose one page is not completed, the core that executes the rasterization processing by the RAS slave can be additionally set, and the rasterization processing can be individually executed by the additionally set core concerned and the cores set previously. Accordingly, the efficiency enhancement of the rasterization processing can be further achieved.

In the above description, the example has been disclosed, where the ROM is used as a computer-readable medium for the program according to the present invention; however, the present invention is not limited to this example. As other computer-readable mediums, it is possible to apply a non-volatile memory such as a flash memory, and a portable recording medium such as a CD-ROM. Moreover, as a medium that provides the data of the program according to the present invention through a communication line, a carrier wave is also applied to the present invention.

Moreover, the present invention is not limited to the contents of the above-described embodiment, and is appropriately modifiable within the scope without departing from the spirit of the present invention.

According to an aspect of the preferred embodiment of the present invention, there is provided a print data generation device comprising:

a storage unit including: a region in which there are temporarily stored data in an intermediate language format between data in a page description language format and print data, and the print data to be generated based on the data in the intermediate language format; and a rasterization region for use at a time when rasterization processing in which the print data is to be generated based on the data in the intermediate language format is executed; and a control unit that includes a plurality of arithmetic operation parts, sets arithmetic operation parts which execute the rasterization processing based on a status of use of the arithmetic operation parts and a status of a free region of the storage unit, and executes the rasterization processing for each of the set arithmetic operation parts.

In accordance with the present invention, the plurality of arithmetic operation parts and the memory region can be used effectively, and the efficiency enhancement of the rasterization processing can be achieved. Accordingly, the generation efficiency of the print data can be enhanced.

Preferably, in a case where the free region in the storage unit is insufficient during execution of the rasterization processing using the plurality of arithmetic operation parts, the control unit reduces the number of the arithmetic operation parts which execute the rasterization processing, and reduces the rasterization region for use when the rasterization processing is executed.

In accordance with this configuration, in the case where the free region in the storage unit becomes insufficient, the number of arithmetic operation parts which execute the rasterization processing is reduced, and the rasterization region for use in executing the rasterization processing concerned is reduced, whereby the new free region will be generated, and the stop of the rasterization processing owing to the lack of the free region can be prevented.

Preferably, the control unit counts an execution time of the rasterization processing for each of the arithmetic operation parts, and ends rasterization processing by an arithmetic operation part in which the execution time is minimum among the plurality of arithmetic operation parts which execute the rasterization processing, and reduces the number of arithmetic operation parts which execute the rasterization processing.

In accordance with this configuration, the rasterization processing by the arithmetic operation part in which the execution time of the rasterization processing is the minimum is ended, whereby the new free region can be generated.

Preferably, the control unit selects an arithmetic operation part in which the status of use is idle or processing lower in preset priority than the rasterization processing is being executed, and in a case where there is a region capable of ensuring the rasterization region in the status of the free region of the storage unit, the control unit performs, for the selected arithmetic operation part, setting as an arithmetic operation part that executes the rasterization processing, and setting on the rasterization region where the rasterization processing is to be executed.

In accordance with this configuration, for the arithmetic operation part that is in the idle state or is executing the processing lower in preset priority than the rasterization processing, there can be performed: the setting as the arithmetic operation part that executes the rasterization processing; and the setting on the rasterization region where the rasterization processing is to be executed.

Preferably, the control unit executes the rasterization processing in a unit of bands into which one page is divided by a predetermined number of lines, and assigns, to the arithmetic operation parts which execute the rasterization processing, the bands in which the rasterization processing is to be executed.

In accordance with this configuration, to the arithmetic operation part that executes the rasterization processing, the bands for which the rasterization processing is to be executed are assigned, and the rasterization processing can be executed in the unit of the bands. Accordingly, the reduction of the processing time per page can be achieved.

Preferably, in a case where the rasterization processing for all the bands which compose one page is not completed, the control unit additionally sets an arithmetic operation part, the arithmetic operation part executing the rasterization processing, based on the status of use of the arithmetic operation parts and the status of the free region of the storage unit, and executes the rasterization processing individually performed by the additionally set arithmetic operation part and the arithmetic operation parts set previously.

In accordance with this configuration, in the case where the rasterization processing for all the bands which compose one page is not completed, the arithmetic operation part that executes the rasterization processing can be additionally set, and the rasterization processing can be individually executed by the additionally set arithmetic operation part concerned and the arithmetic operation parts set previously. Accordingly, the efficiency enhancement of the rasterization processing can be further achieved.

According to another aspect of the preferred embodiment of the present invention, there is provided a print data generation method comprising:

based on a status of use of a plurality of arithmetic operation parts which perform rasterization processing in which print data is to be generated based on data in an intermediate language format between data in a page description language format and the print data, and on a status of a free region of a storage unit that includes a rasterization region for use at a time when the rasterization processing is executed, setting arithmetic operation parts which execute the rasterization processing; and executing the rasterization processing for each of the set arithmetic operation parts.

In accordance with this configuration, the plurality of arithmetic operation parts and the memory region can be used effectively, and the efficiency enhancement of the rasterization processing can be achieved. Accordingly, the generation efficiency of the print data can be enhanced.

Preferably, the print data generation method further comprises:

in a case where the free region in the storage unit is insufficient during execution of the rasterization processing using the plurality of arithmetic operation parts, reducing the number of the arithmetic operation parts which execute the rasterization processing, and reducing the rasterization region for use when the rasterization processing is executed.

In accordance with this configuration, in the case where the free region in the storage unit becomes insufficient, the number of arithmetic operation parts which execute the rasterization processing is reduced, and the rasterization region for use in executing the rasterization processing concerned is reduced, whereby the new free region will be generated, and the stop of the rasterization processing owing to the lack of the free region can be prevented.

Preferably, in reducing the rasterization region, an execution time of the rasterization processing is counted for each of the arithmetic operation parts, rasterization processing by an arithmetic operation part in which the execution time is minimum is ended among the plurality of arithmetic operation parts which execute the rasterization processing, and the number of arithmetic operation parts which execute the rasterization processing is reduced.

In accordance with this configuration, the rasterization processing by the arithmetic operation part in which the execution time of the rasterization processing is the minimum is ended, whereby the new free region can be generated.

Preferably, in setting the arithmetic operation parts which execute the rasterization processing, there are included: selecting an arithmetic operation part in which the status of use is idle or processing lower in preset priority than the rasterization processing is being executed, and in a case where there is a region capable of ensuring the rasterization region in the status of the free region of the storage unit, performing, for the selected arithmetic operation part, setting as an arithmetic operation part that executes the rasterization processing; and performing setting on the rasterization region where the rasterization processing is to be executed.

In accordance with this configuration, for the arithmetic operation part that is in the idle state or is executing the processing lower in preset priority than the rasterization processing, there can be performed: the setting as the arithmetic operation part that executes the rasterization processing; and the setting on the rasterization region where the rasterization processing is to be executed.

Preferably, in setting the arithmetic operation parts which execute the rasterization processing, one page to be subjected to the rasterization processing is divided into a unit of bands having a predetermined number of lines, and the bands in which the rasterization processing is to be executed are assigned to the arithmetic operation parts which execute the rasterization processing, and in executing the rasterization processing, the arithmetic operation parts which execute the rasterization processing execute the rasterization processing in the unit of the bands.

In accordance with this configuration, to the arithmetic operation part that executes the rasterization processing, the bands for which the rasterization processing is to be executed are assigned, and the rasterization processing can be executed in the unit of the bands. Accordingly, the reduction of the processing time per page can be achieved.

Preferably, the print data generation method further comprises:

in a case where the rasterization processing for all the bands which compose one page is not completed, additionally setting an arithmetic operation part, the arithmetic operation part executing the rasterization processing, based on the status of use of the arithmetic operation parts and the status of the free region of the storage unit; and executing the rasterization processing individually performed by the additionally set arithmetic operation part and the arithmetic operation parts set previously.

In accordance with this configuration, in the case where the rasterization processing for all the bands which compose one page is not completed, the arithmetic operation part that executes the rasterization processing can be additionally set, and the rasterization processing can be individually executed by the additionally set arithmetic operation part concerned and the arithmetic operation parts set previously. Accordingly, the efficiency enhancement of the rasterization processing can be further achieved.

According to still another aspect of the preferred embodiment of the present invention, there is provided a computer-readable medium that embodies a program for allowing execution of the steps of:

based on a status of use of a plurality of arithmetic operation parts which perform rasterization processing in which print data is to be generated based on data in an intermediate language format between data in a page description language format and the print data, and on a status of a free region of a storage unit that includes a rasterization region for use at a time when the rasterization processing is executed, setting arithmetic operation parts which execute the rasterization processing; and executing the rasterization processing for each of the set arithmetic operation parts.

In accordance with the present invention, the plurality of arithmetic operation parts and the memory region can be used effectively, and the efficiency enhancement of the rasterization processing can be achieved. Accordingly, the generation efficiency of the print data can be enhanced.

Preferably, the medium further comprises the steps of:

in a case where the free region in the storage unit is insufficient during execution of the rasterization processing using the plurality of arithmetic operation parts, reducing the number of the arithmetic operation parts which execute the rasterization processing, and reducing the rasterization region for use when the rasterization processing is executed.

In accordance with this configuration, in the case where the free region in the storage unit becomes insufficient, the number of arithmetic operation parts which execute the rasterization processing is reduced, and the rasterization region for use in executing the rasterization processing concerned is reduced, whereby the new free region will be generated, and the stop of the rasterization processing owing to the lack of the free region can be prevented.

Preferably, in the step of reducing the rasterization region, an execution time of the rasterization processing is counted for each of the arithmetic operation parts, and rasterization processing by an arithmetic operation part in which the execution time is minimum is ended among the plurality of arithmetic operation parts which execute the rasterization processing, and the number of arithmetic operation parts which execute the rasterization processing is reduced.

In accordance with this configuration, the rasterization processing by the arithmetic operation part in which the execution time of the rasterization processing is the minimum is ended, whereby the new free region can be generated.

Preferably, in the step of setting the arithmetic operation parts which execute the rasterization processing, there are included: selecting an arithmetic operation part in which the status of use is idle or processing lower in preset priority than the rasterization processing is being executed, and in a case where there is a region capable of ensuring the rasterization region in the status of the free region of the storage unit, performing, for the selected arithmetic operation part, setting as an arithmetic operation part that executes the rasterization processing; and performing setting on the rasterization region where the rasterization processing is to be executed.

In accordance with this configuration, for the arithmetic operation part that is in the idle state or is executing the processing lower in preset priority than the rasterization processing, there can be performed: the setting as the arithmetic operation part that executes the rasterization processing; and the setting on the rasterization region where the rasterization processing is to be executed.

Preferably, in the step of setting the arithmetic operation parts which execute the rasterization processing, one page to be subjected to the rasterization processing is divided into a unit of bands having a predetermined number of lines, and the bands in which the rasterization processing is to be executed are assigned to the arithmetic operation parts which execute the rasterization processing, and in the step of executing the rasterization processing, the arithmetic operation parts which execute the rasterization processing execute the rasterization processing in the unit of the bands.

In accordance with this configuration, to the arithmetic operation part that executes the rasterization processing, the bands for which the rasterization processing is to be executed are assigned, and the rasterization processing can be executed in the unit of the bands. Accordingly, the reduction of the processing time per page can be achieved.

Preferably, the medium further comprises the steps of:

in a case where the rasterization processing for all the bands which compose one page is not completed, additionally setting an arithmetic operation part, the arithmetic operation part executing the rasterization processing, based on the status of use of the arithmetic operation parts and the status of the free region of the storage unit; and executing the rasterization processing individually performed by the additionally set arithmetic operation part and the arithmetic operation parts set previously.

In accordance with this configuration, in the case where the rasterization processing for all the bands which compose one page is not completed, the arithmetic operation part that executes the rasterization processing can be additionally set, and the rasterization processing can be individually executed by the additionally set arithmetic operation part concerned and the arithmetic operation parts set previously. Accordingly, the efficiency enhancement of the rasterization processing can be further achieved.

What is claimed is:

1. A print data generation device comprising:
    a storage unit including: a region in which there are temporarily stored data in an intermediate language format between data in a page description language format and print data, and the print data to be generated based on the data in the intermediate language format; and a rasterization region for use at a time when rasterization processing in which the print data is to be generated based on the data in the intermediate language format is executed; and
    a control unit that includes a plurality of arithmetic operation parts, sets arithmetic operation parts which execute the rasterization processing based on a status of use of the arithmetic operation parts and a status of a free region of the storage unit, and executes the rasterization processing for each of the set arithmetic operation parts,
    wherein, in a case where the free region in the storage unit is insufficient during execution of the rasterization processing using the plurality of arithmetic operation parts, the control unit reduces the number of the arithmetic operation parts which execute the rasterization processing and reduces the rasterization region for use when the rasterization processing is executed, and
    when reducing, the rasterization region, the control unit counts an execution time of the rasterization processing for each of the arithmetic operation parts, ends rasterization processing by an arithmetic operation part in which the execution time is minimum among the plurality of arithmetic operation parts which execute the rasterization processing, and reduces the number of arithmetic operation parts which execute the rasterization processing.

2. The print data generation device according to claim 1, wherein the control unit selects an arithmetic operation part in which the status of use is idle or processing lower in preset priority than the rasterization processing is being executed, and in a case where there is a region capable of ensuring the rasterization region in the status of the free region of the storage unit, the control unit performs, for the selected arithmetic operation part, setting as an arithmetic operation part that executes the rasterization processing, and setting on the rasterization region where the rasterization processing is to be executed.

3. The print data generation device according to claim 1, wherein the control unit executes the rasterization processing in a unit of bands into which one page is divided by a predetermined number of lines, and assigns, to the arithmetic operation parts which execute the rasterization processing, the bands in which the rasterization processing is to be executed.

4. The print data generation device according to claim 3, wherein, in a case where the rasterization processing for all the bands which compose one page is not completed, the control unit additionally sets an arithmetic operation part, the arithmetic operation part executing the rasterization processing, based on the status of use of the arithmetic operation parts and the status of the free region of the storage unit, and executes the rasterization processing individually performed by the additionally set arithmetic operation part and the arithmetic operation parts set previously.

5. A print data generation method comprising:

based on a status of use of a plurality of arithmetic operation parts which perform rasterization processing in which print data is to be generated based on data in an intermediate language format between data in a page description language format and the print data, and on a status of a free region of a storage unit that includes a rasterization region for use at a time when the rasterization processing is executed, setting arithmetic operation parts which execute the rasterization processing;

executing the rasterization processing for each of the set arithmetic operation parts; and in a case where the free region unit is insufficient during execution of the rasterization processing using the plurality of arithmetic operation parts, reducing the number of the arithmetic operation parts which execute the rasterization processing and reducing the rasterization region for use when the rasterization processing is executed, wherein, in reducing the rasterization region, an execution time of the rasterization processing is counted for each of the arithmetic operation parts, rasterization processing by an arithmetic operation part in which the execution time is minimum is ended among the plurality of arithmetic operation parts which execute the rasterization processing, and the number of arithmetic operation parts which execute the rasterization processing is reduced.

6. The print data generation method according to claim 5, wherein, in setting the arithmetic operation parts which execute the rasterization processing, there are included: selecting an arithmetic operation part in which the status of use is idle or processing lower in preset priority than the rasterization processing is being executed, and in a case where there is region capable of ensuring the rasterization region in the status of the free region of the storage unit, performing, for the selected arithmetic operation part, setting as an arithmetic operation part that executes the rasterization processing; and performing setting on the rasterization region where the rasterization processing is to be executed.

7. The print data generation method according to claim 5, wherein, in setting the arithmetic operation parts which execute the rasterization processing, one page to be subjected to the rasterization processing is divided into a unit of bands having a predetermined number of lines, and the bands in which the rasterization processing is to be executed are assigned to the arithmetic operation parts which execute the rasterization processing, and in executing the rasterization processing, the arithmetic operation parts which execute the rasterization processing execute the rasterization processing in unit of the bands.

8. The print data generation method according to claim 7, further comprising:

In a case where the rasterization processing for all the bands which compose one page is not completed, additionally setting an arithmetic operation part, the arithmetic operation part executing the rasterization processing, based on the status of use of the arithmetic operation parts and the status of the free region of the storage unit; and executing the rasterization processing individually performed by the additionally set arithmetic operation part and the arithmetic operation parts set previously.

9. A non-transitory computer-readable medium that embodies a program for allowing execution of the steps of:

based on a status of use of a plurality of arithmetic operation parts which perform rasterization processing in which print data is to be generated based on data in an intermediate language format between data in a page description language format and the print data, and on a status of a free region of a storage unit that includes a rasterization region for use at a time when the rasterization processing is executed, setting arithmetic operation parts which execute the rasterization processing;

executing the rasterization processing for each of the set arithmetic operation parts; and in a case where the free region in the storage unit is insufficient during execution of the rasterization processing using the plurality of arithmetic operation parts, reducing the number of the arithmetic operation parts which execute the rasterization processing and reducing the rasterization region for use when the rasterization region for use when the rasterization processing is executed, wherein, in the step of reducing the rasterization region, an execution time of the rasterization processing is counted for each of the arithmetic operation parts, rasterization processing by an arithmetic operation party which execute time is minimum is end among the plurality of arithmetic operation parts which execute the rasterization processing, and the number of arithmetic operation parts which execute the rasterization processing is reduced.

10. The medium according to claim 9, wherein, in the step of setting the arithmetic operation parts which execute the rasterization processing, there are included: selecting an arithmetic operation part in which the status of use is idle or processing lower in preset priority than the rasterization processing is being executed, and in a case where there is a region capable of ensuring the rasterization region in the status of the free region of the storage unit, performing, for the selected arithmetic operation part, setting as an arithmetic operation part that executes the rasterization processing; and performing setting on the rasterization region where the rasterization processing is to be executed.

11. The medium according to claim 9, wherein, in the step of setting the arithmetic operation parts which execute the rasterization processing, one page to be subjected to the rasterization processing is divided into a unit of bands having a predetermined number of lines, and the bands in which the rasterization processing is to be executed are assigned to the arithmetic operation parts which execute the rasterization processing, and in the step of executing the rasterization processing, the arithmetic operation parts which execute the rasterization processing execute the rasterization processing in the unit of the bands.

12. The medium according to claim 11, further comprising the steps of:
- in a case where the rasterization processing for all the bands which compose one page is not completed, additionally setting an arithmetic operation part, the arithmetic operation part executing the rasterization processing, based on the status of use of the arithmetic operation parts and the status of the free region of the storage unit; and
- executing the rasterization processing individually performed by the additionally set arithmetic operation part and the arithmetic operation parts set previously.

* * * * *